(12) United States Patent
Asano et al.

(10) Patent No.: US 10,562,128 B2
(45) Date of Patent: Feb. 18, 2020

(54) LINEAR FRICTION WELDING APPARATUS

(71) Applicant: IHI Corporation, Koto-ku (JP)

(72) Inventors: Nozomu Asano, Tokyo (JP); Yasushi Dodo, Tokyo (JP); Yuichiro Nakayama, Tokyo (JP); Miki Shinagawa, Tokyo (JP); Wataru Ueda, Tokyo (JP)

(73) Assignee: IHI Corporation, Koto-ku (JP)

( * ) Notice: Subject to any disclaimer, the term of this patent is extended or adjusted under 35 U.S.C. 154(b) by 211 days.

(21) Appl. No.: 15/884,923

(22) Filed: Jan. 31, 2018

(65) Prior Publication Data
US 2018/0154478 A1 Jun. 7, 2018

Related U.S. Application Data

(63) Continuation of application No. PCT/JP2016/083013, filed on Nov. 8, 2016.

(30) Foreign Application Priority Data

Nov. 9, 2015 (JP) .................................. 2015-219363
Nov. 17, 2015 (JP) .................................. 2015-224824
Nov. 17, 2015 (JP) .................................. 2015-224828

(51) Int. Cl.
*B23K 20/00* (2006.01)
*B23K 20/12* (2006.01)
(Continued)

(52) U.S. Cl.
CPC .......... *B23K 20/1205* (2013.01); *B23K 20/12* (2013.01); *B23K 20/129* (2013.01);
(Continued)

(58) Field of Classification Search
CPC .......... B23K 2101/001; B23K 20/1205; B23K 20/129; B23K 11/002; B23K 20/12;
(Continued)

(56) References Cited

U.S. PATENT DOCUMENTS 3,460,734 A * 8/1969 Kochanovsky ........ B23K 20/12
228/2.3
5,035,411 A * 7/1991 Daines ............... B23K 20/1205
269/231

(Continued)

FOREIGN PATENT DOCUMENTS

CN 1994652 A 7/2007
CN 101020275 A 8/2007
(Continued)

OTHER PUBLICATIONS

Combined Chinese Office Action and Search Report dated Jul. 1, 2019 in Chinese Patent Application No. 201680045814.4, (with English Translation of Categories of Cited Documents) citing documents AO-AQ therein, 7 pages.
(Continued)

*Primary Examiner* — Erin B Saad
(74) *Attorney, Agent, or Firm* — Oblon, McClelland, Maier & Neustadt, L.L.P.

(57) ABSTRACT

An oscillation jig includes: an oscillation jig base connected to an oscillation table; a first clamp member provided in the oscillation jig base; a second clamp member located at a position opposed to the first clamp member in an oscillation direction and configured to hold a first metal component together with the first clamp member; a link mechanism provided in the oscillation jig base, composed of a plurality of links connected together, connected to the second clamp member, and caused to extend and contract in the oscillation direction; and a clamp actuator configured to cause the link mechanism to extend and contract in the oscillation direction. When the first clamp member and the second clamp member hold the first metal component, a connection center line connecting connection centers of the respective links is made straight in the oscillation direction.

9 Claims, 17 Drawing Sheets

(51) Int. Cl.
  *F01D 5/34*   (2006.01)
  *F01D 25/00*  (2006.01)
  *F02C 7/00*   (2006.01)
  *F01D 5/30*   (2006.01)
  *B23K 101/00* (2006.01)

(52) U.S. Cl.
  CPC ............ *F01D 5/30* (2013.01); *F01D 5/3061* (2013.01); *F01D 5/34* (2013.01); *F01D 25/00* (2013.01); *F02C 7/00* (2013.01); *B23K 2101/001* (2018.08)

(58) Field of Classification Search
  CPC .. B23K 11/04; B23K 11/3081; B23K 1/0018; B23K 1/0056; B23K 20/121; B23K 20/1215; B23K 2101/185; B23K 2103/14; B23K 37/0443
  USPC .... 228/2.1, 112.1, 44.3, 119, 212, 104, 177, 228/265, 2.3
  See application file for complete search history.

(56) References Cited

U.S. PATENT DOCUMENTS

| | | | | |
|---|---|---|---|---|
| 5,248,077 A | * | 9/1993 | Rhoades | B23K 20/1205 228/112.1 |
| 5,551,623 A | * | 9/1996 | Collot | B23K 20/1205 228/112.1 |
| 5,678,750 A | * | 10/1997 | Harris | B23K 20/1205 228/2.1 |
| 6,354,482 B1 | * | 3/2002 | Diebold | B23K 20/129 156/580.2 |
| 6,933,459 B2 | * | 8/2005 | Helder | B23K 11/002 219/117.1 |
| 7,353,978 B2 | * | 4/2008 | Slattery | B23K 20/1205 228/112.1 |
| 7,784,182 B2 | * | 8/2010 | Carrier | B23K 20/129 29/889.23 |
| 2003/0201305 A1 | | 10/2003 | Trask | |
| 2014/0050519 A1 | | 2/2014 | Oiwa et al. | |

FOREIGN PATENT DOCUMENTS

| | | |
|---|---|---|
| CN | 103547402 A | 1/2014 |
| EP | 1 323 490 A2 | 7/2003 |
| JP | 63-173617 | 7/1988 |
| JP | 11-47958 | 2/1999 |
| JP | 2000-141061 | 5/2000 |
| JP | 2000-280308 | 10/2000 |
| JP | 2002-153975 | 5/2002 |
| JP | 2003-200277 | 7/2003 |
| JP | 2004-311061 | 11/2004 |
| JP | 2012-228703 | 11/2012 |
| JP | 2015-66579 | 4/2015 |
| JP | 2015-108338 | 6/2015 |

OTHER PUBLICATIONS

International Search Report dated Feb. 7, 2017 in PCT/JP2016/083013, filed on Nov. 8, 2016(with English Translation).
Written Opinion dated Feb. 7, 2017 in PCT/JP2016/083013, filed on Nov. 8, 2016.
Extended European Search Report dated Feb. 12, 2019 in European Patent Application No. 16864180.1 citing document AO therein, 7 pages.

* cited by examiner

FIG. 15
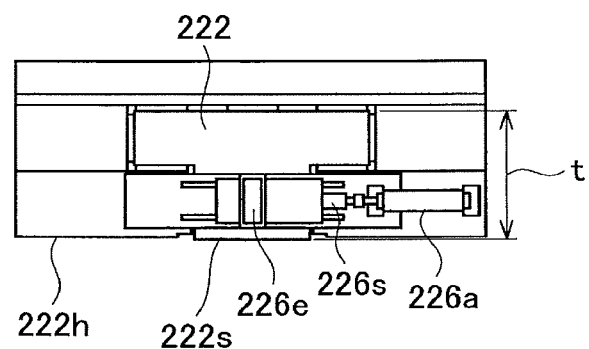
(a)
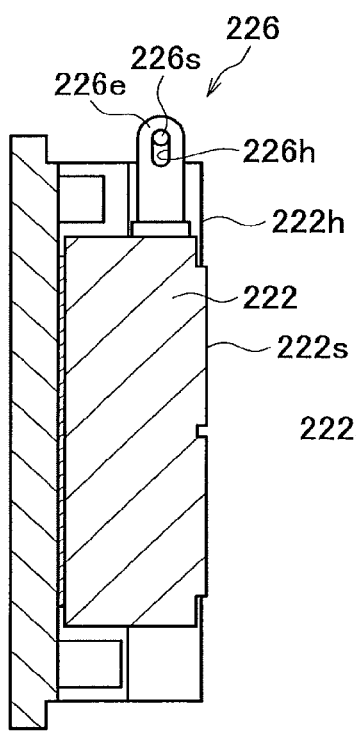
(c)
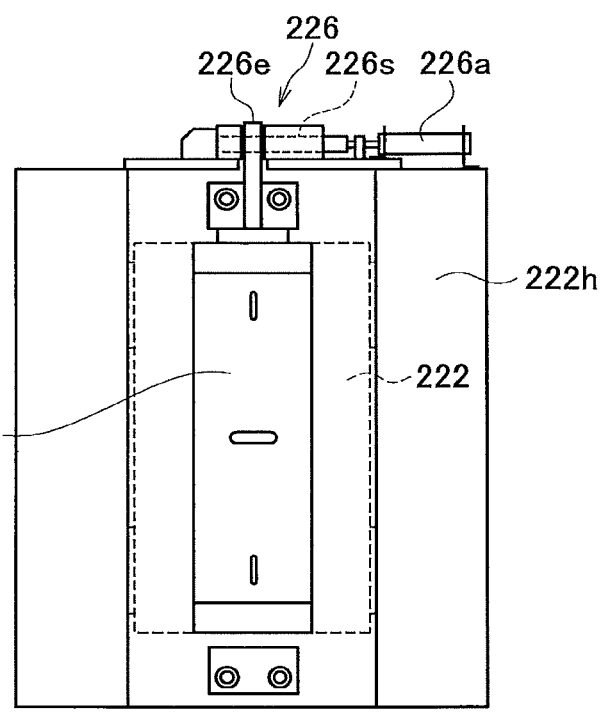
(b)

LINEAR FRICTION WELDING APPARATUS

CROSS REFERENCE TO RELATED APPLICATIONS

This application is a continuation application of International Application No. PCT/JP2016/083013, filed on Nov. 8, 2016, which claims priority to Japanese Patent Application No. 2015-219363, filed on Nov. 9, 2015, Japanese Patent Application No. 2015-224824, filed on Nov. 17, 2015, and Japanese Patent Application No. 2015-224828, filed on Nov. 17, 2015, the entire contents of which are incorporated by reference herein.

BACKGROUND

1. Technical Field

Embodiments described herein relate to a linear friction welding apparatus for welding weld joint surfaces of a pair of metal components, such as a blade and a disk of a blisk (a bladed disk), by use of a frictional heat generated between the weld joint surfaces of the pair of the metal components.

2. Description of the Related Art

Japanese Patent Application Publication No. 2015-108338 (Patent Literature 1), Japanese Patent Application Publication No. 2015-066579 (Patent Literature 2) and Japanese Patent Application Publication No. 2012-228703 (Patent Literature 3) disclose linear friction welding apparatuses used for manufacturing or repairing blisks and the like.

A body of a linear friction welding apparatus includes a bed and a column provided on the bed. The column is provided with an oscillation table on the side surface. The oscillation table is movable in the vertical direction which is an oscillation direction. The oscillation table is provided with an oscillation jig on the side surface to hold a first metal component such as a blade of a blisk. The oscillation jig includes an oscillation jig base provided on the oscillation table, a pair of clamp members opposed to each other in the oscillation direction to hold the first metal component, and a clamp cylinder for moving one of the clamp members in the oscillation direction.

The bed includes a pressure table above the upper surface of the bed and located separately from the oscillation table. The pressure table is movable in the horizontal direction, which is a pressure direction, perpendicular to the oscillation direction. The pressure table is provided with a pressure jig above the pressure table to hold a second metal component such as a disk of the blisk.

With this configuration, a weld joint surface of the first metal component held by the oscillation jig is opposed to a weld joint surface of the second metal component held by the pressure jig. While an oscillation slider is reciprocated in the oscillation direction, the pressure table is moved in the pressure direction. The weld joint surface of the second metal component is then led to come closer to the weld joint surface of the first metal component while the first metal component is reciprocated in the oscillation direction, so that the second metal component is pressed against the weld joint surface of the first metal component. Accordingly, a frictional heat is generated between the weld joint surfaces of the pair of the metal components, so as to weld the weld joint surfaces of the metal components together.

The linear friction welding apparatus has the advantage of manufacturing products while improving the efficiency of utilization of a raw material and achieving an increase in mechanical strength and a reduction in weight of the products. For example, if a blisk is manufactured such that a material is cut out by machining, a large amount of cut-out powder is generated, which reduces the efficiency of utilization of the material. In contrast, the liner friction welding apparatus welds and integrates the disk and the blade formed separately by linear friction welding, so as to improve the efficiency of utilization of the material (for example, refer to Patent Literature 4: Japanese Patent Application Publication No. 2000-141061 (Patent Literature 4)).

SUMMARY

In association with a recent increase in size of a pair of metal components to be welded together, a welded area of the pair of the metal components increases, which increases a frictional force between weld joint surfaces of the pair of the metal components during welding. Thus, it is necessary to increase thrust of a clamp cylinder to enhance a holding force (a clamping force) of a pair of clamp members, so as to keep a state in which a first metal component is strongly fixed to an oscillation table during welding to sufficiently ensure accuracy of welding the weld joint surface of the first metal component. However, the size of the clamp cylinder inevitably increases in order to increase the thrust of the clamp cylinder, and accordingly, the sizes of the oscillation jig base, the oscillation table, and the like also increase. As a result, a reduction in size of the entire linear friction welding apparatus cannot be achieved.

Further, it is important for the liner friction welding apparatus to control a pressure force for pressing the two components. The linear friction welding apparatus measures the pressure force acting on the two components with a load sensor provided between the two components in the pressure direction and controls a pressure mechanism to regulate the pressure force depending on the measured value so as to result in a predetermined value.

However, it is difficult to accurately measure the pressure force actually acting on the two components because a large downward load or moment load (bending moment) is applied to the load sensor. This prevents improvement in accuracy of welding the two components together.

Since the size of the metal component (such as the blade welded to the disk) welded by the liner friction welding apparatus increases, a length of an elongated pressure application member (such as a piston rod) for pressing a holding jig toward the load sensor also increases, taking account of a draft of the metal component and replacement of a holding member (such as a disk jig for holding the disk). Accordingly, the downward load or the moment load applied to the load sensor further increases, which should be solved immediately.

In the conventional linear friction welding apparatus, a large moment load (a bending moment: the unit is Nm, for example) is applied to a component to be moved by oscillation (in general, one of the two metal components), which also prevents the accuracy of welding the two components together. The increase in size of the metal component (such as the blade welded to the disk) welded by the liner friction welding apparatus increases the moment load, which should be solved immediately.

An object of the present disclosure is to provide a linear friction welding apparatus having a configuration capable of improving welding accuracy.

A linear friction welding apparatus according to an aspect of the present disclosure for welding a first member and a second member together by friction welding by pressing the first member and the second member against each other while causing a relative oscillation movement between the first member and the second member, includes: a pressure mechanism configured to press the first member and the second member against each other; a first holding member configured to hold the first member; and a second holding member configured to hold the second member and caused to advance and retreat in a direction conforming to a pressure axis, the pressure mechanism has: a pressure force application member caused to advance and retreat in the direction conforming to the pressure axis; a load sensor attached to the second holding member and configured to measure a pressure force in the direction conforming to the pressure axis; and a support mechanism fixed to the second holding member, connected to the pressure force application member, and configured to support a moment load applied from the pressure force application member, the support mechanism has: a base member fixed to the second holding member; and a support member including a pressure force transmission portion located between the load sensor and the pressure force application member, engaged with the base member so as to advance and retreat in the direction conforming to the pressure axis, and connected to a tip of the pressure force application member.

BRIEF DESCRIPTION OF THE DRAWINGS

FIG. 15 is a view showing a slider according to the third embodiment of the present disclosure.

DESCRIPTION OF THE EMBODIMENTS

Figure 1:
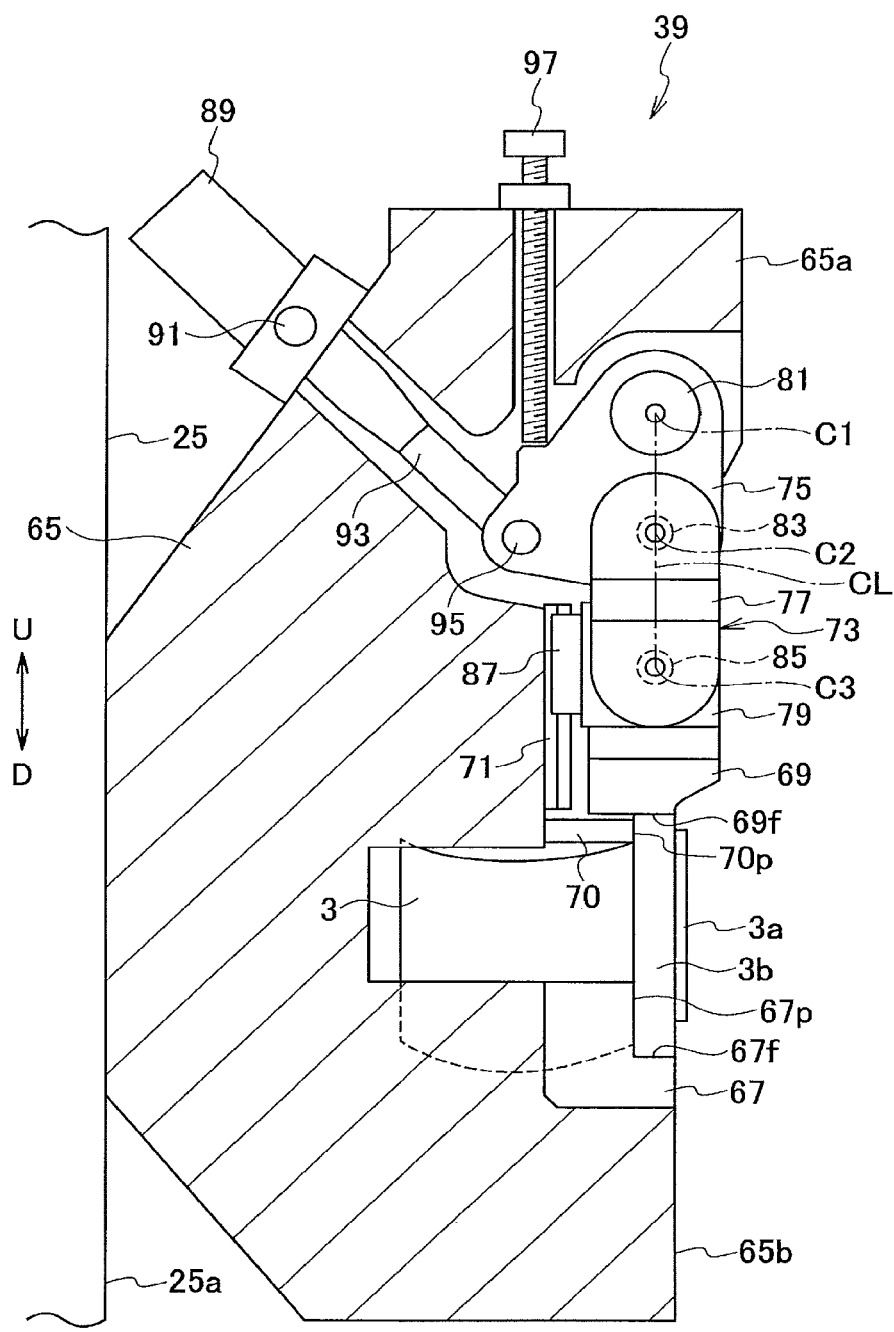
FIG. 1 is a cross-sectional view of an oscillation jig according to a first embodiment of the present disclosure, showing a state in which a held portion of a blade is held.

Embodiments of the present disclosure will be described below with reference to the drawings. The following linear friction welding apparatuses will be illustrated with a case in which a blade and a disk composing a blisk are welded together by friction welding. In the drawings, "FF" refers to a front direction, "FR" refers to a rear direction, "L" refers to a left direction, "R" refers to a right direction, "U" refers to an upper side in a vertical direction (an upward direction), and "D" refers to a lower side in the vertical direction (a downward direction).

First Embodiment

Figure 6:
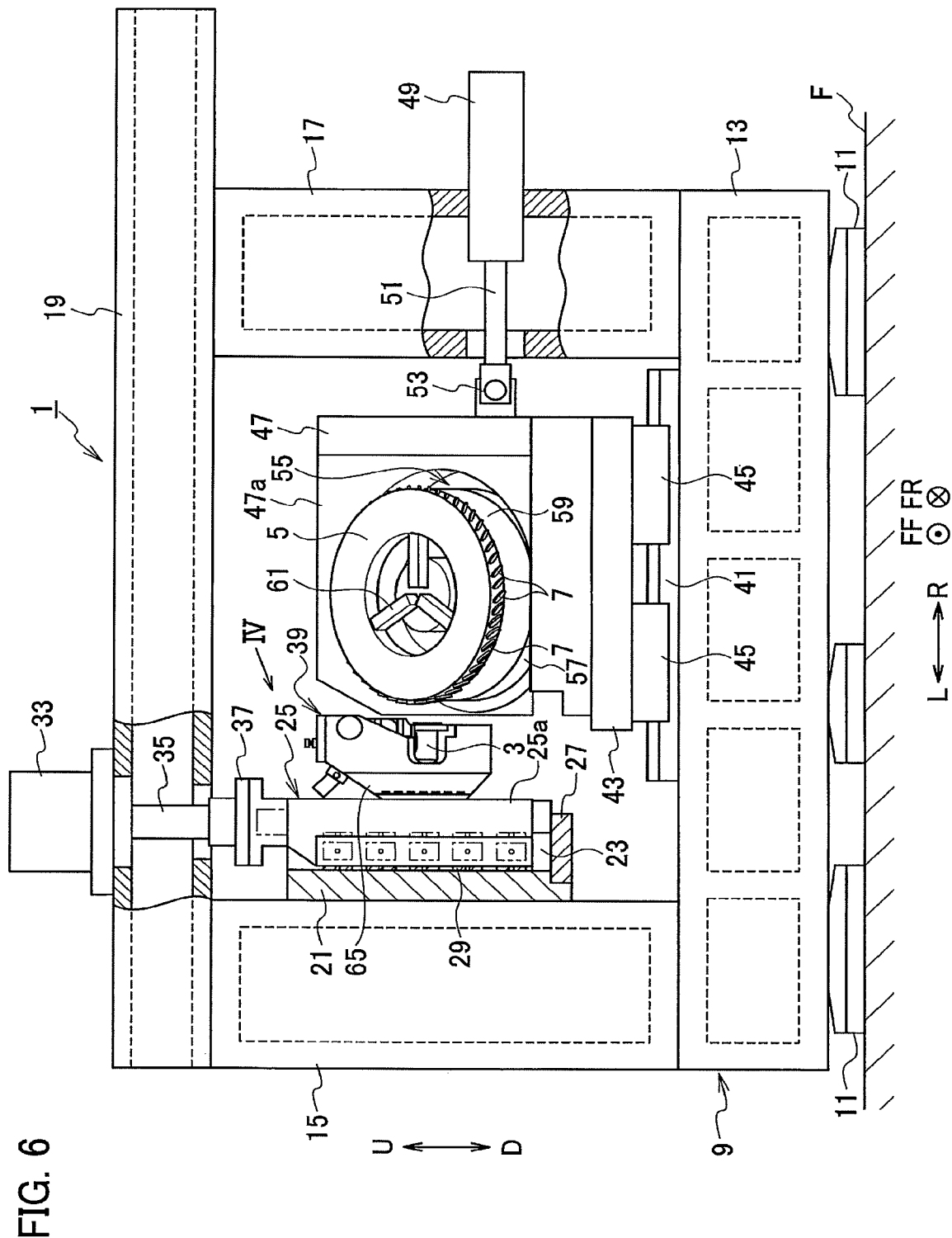
FIG. 6 is a front view of a linear friction welding apparatus according to the first embodiment of the present disclosure.
Figure 7:
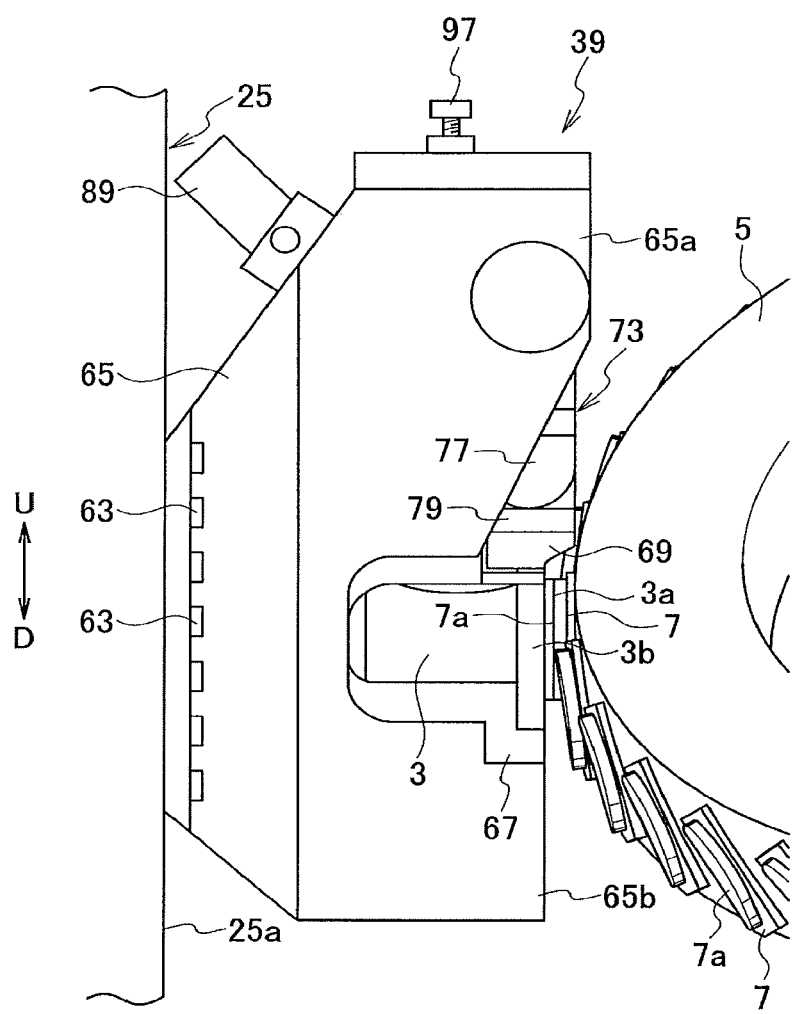
FIG. 7 is a view for illustrating a state in which a weld joint surface of the blade and a weld joint surface of a disk projection are welded together.
Figure 8:
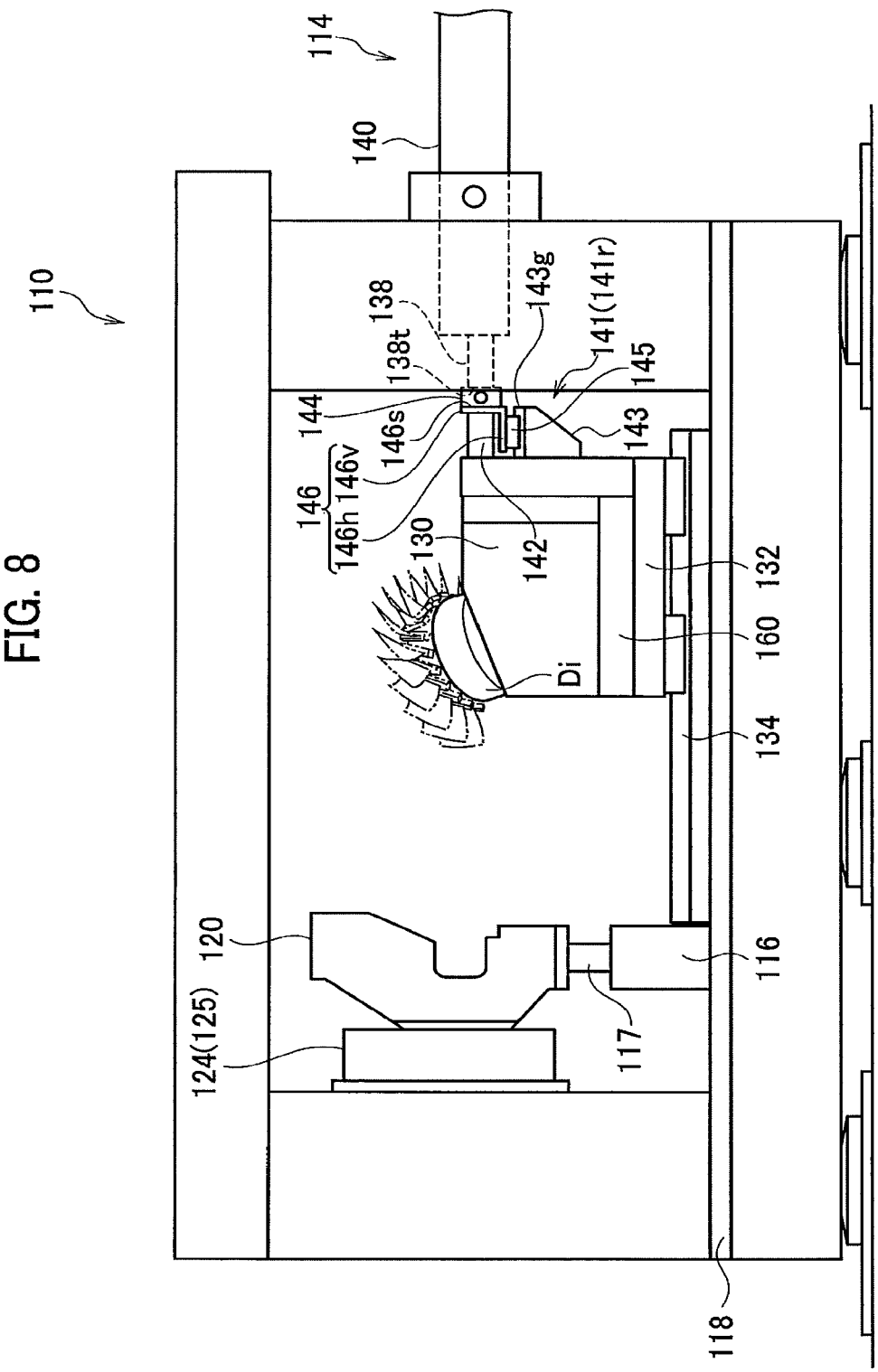
FIG. 8 is a front view of a linear friction welding apparatus according to a second embodiment of the present disclosure (at a loading position).

A linear friction welding apparatus according to a first embodiment of the present disclosure is described below. As shown in FIG. 6 and FIG. 7, the linear friction welding apparatus 1 according to the present embodiment welds together a weld joint surface 3a of a blade 3 and a weld joint surface 7a of a disc projection 7 provided on an outer circumferential surface of a disk 5 by use of a frictional heat generated between the weld joint surface 3a of the blade 3 and the weld joint surface 7a of the disk projection 7.

The blade 3 and the disk 5 are parts composing a blisk (a bladed disk) (not shown) used for a gas turbine (not shown), and are an example of a pair of metal components. The blade 3 includes a rectangular held portion 3b (clamped portion) toward the weld joint surface 3a (on the base side).

The linear friction welding apparatus 1 includes an apparatus body 9. The apparatus body 9 includes a bed 13 installed on a floor F via a plurality of oscillation absorbing rubbers 11. The bed 13 extends in the lateral direction (one of the horizontal directions). The bed 13 includes a first column 15 extending in the vertical direction (the up-down direction) on the left side. The bed 13 also includes a second column 17 extending in the vertical direction on the right side. An upper frame 19 extending in the lateral direction is placed to connect the first column 15 and the second column 17 on the upper side.

Figure 4:
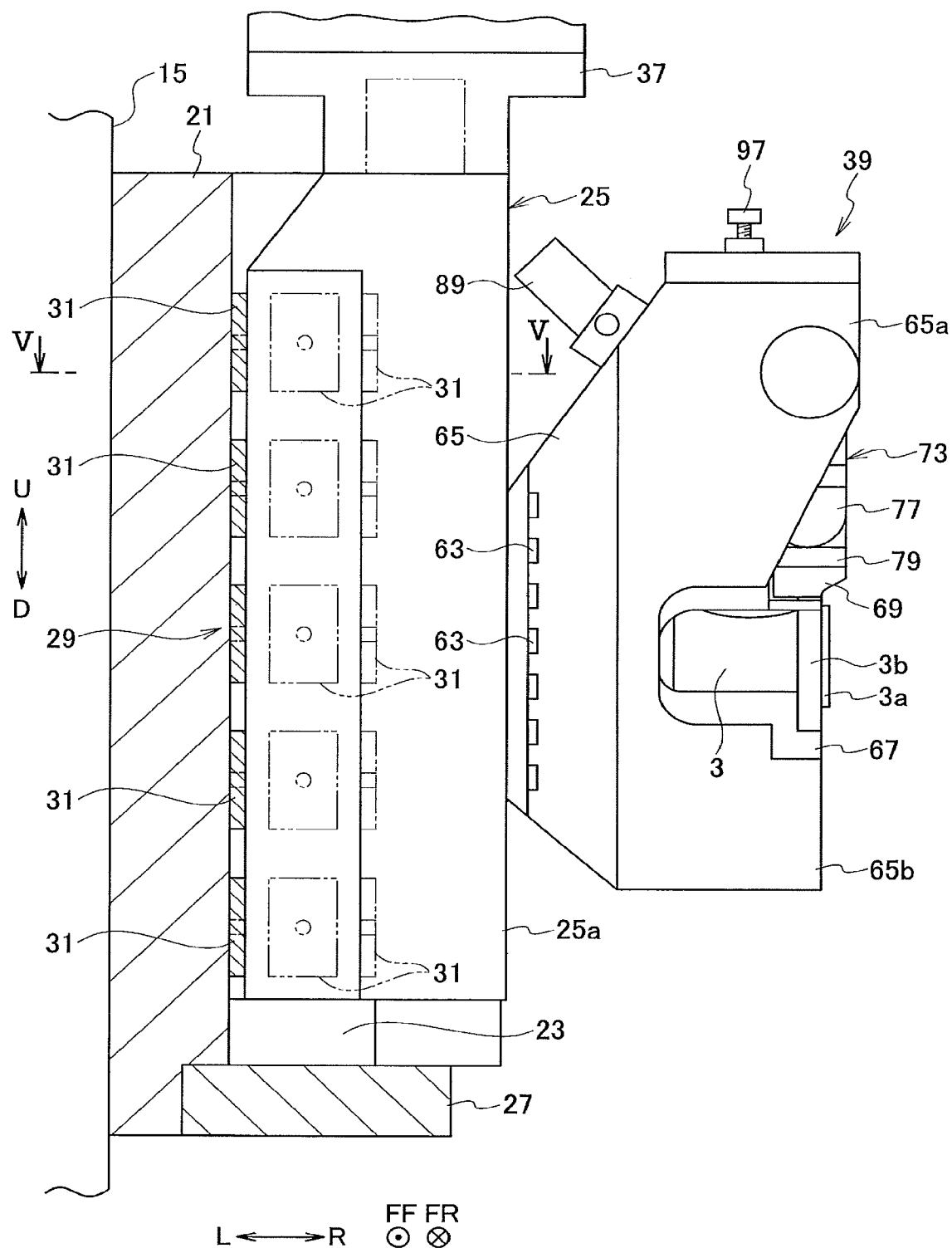
FIG. 4 is an enlarged view on arrow IV in FIG. 6.
Figure 5:
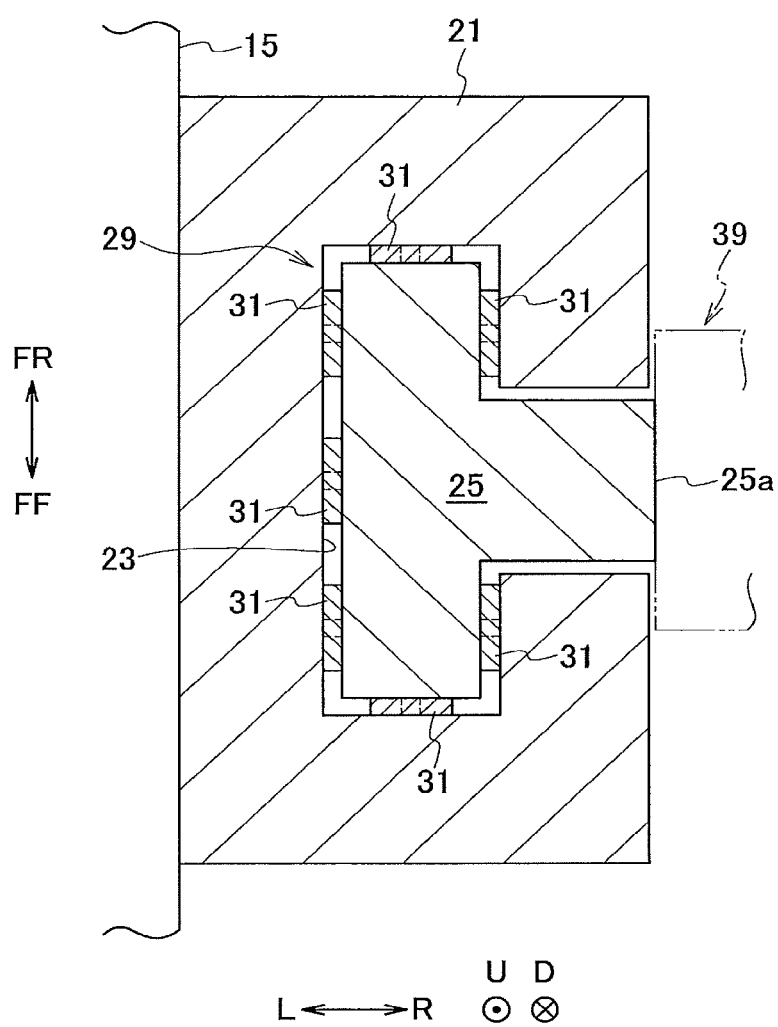
FIG. 5 is a cross-sectional view taken along line V-V in FIG. 4.

As shown in FIG. 4 to FIG. 6, the first column 15 is provided with a guide block 21 on the right surface (on the right side). The guide block 21 includes a guide groove 23 having a T-shape in cross section and extending in the vertical direction. The guide block 21 further includes a rectangular oscillation table 25 in the guide groove 23. The oscillation table 25 is caused to reciprocate in the vertical direction which is an oscillation direction. In particular, the oscillation table 25 is provided on the right surface of the first column 15 via the guide block 21 and movable in the oscillation direction. The oscillation table 25 includes, on the right side, a projection 25a extending in the oscillation direction (the vertical direction). The guide block 21 includes, on the lower side, a stopper plate 27 for preventing the oscillation table 25 from separating from the guide groove 23.

The guide block 21 includes a static pressure support unit 29 in the guide groove 23 for guiding the oscillation table 25 to reciprocate in the oscillation direction by use of a static pressure of support oil (an example of a support fluid). Namely, the oscillation table 25 provided in the guide groove 23 of the guide block 21 is capable of reciprocating in the oscillation direction via the static pressure support unit 29. The static pressure support unit 29 includes a plurality of static pressure pads 31 provided at intervals in the guide groove 23 of the guide block 21. The static pressure pads 31 can inject the support oil toward the left surface, the right surface, the front end surface, and the rear end surface of the oscillation table 25 (excluding the projection 25a of the oscillation table 25). The respective static pressure pads 31 are connected to a supply pump (not shown) for supplying the support oil.

As shown in FIG. 6, the upper frame 19 includes a hydraulic oscillation cylinder 33 at a left portion serving as an oscillation actuator for reciprocating the oscillation table 25 in the oscillation direction at predetermined amplitude. The oscillation cylinder 33 includes a piston rod 35 reciprocated in the oscillation direction. The tip of the piston rod 35 is connected to an appropriate position of the oscillation table 25 via a coupling 37. As used herein, the term "predetermined amplitude" refers to amplitude set at ±10.0 mm or smaller, for example. As the oscillation actuator, an electric oscillation cylinder or oscillation motor (not shown) may be used instead of the hydraulic oscillation cylinder 33.

The oscillation table 25 includes an oscillation jig (an oscillation holder unit) 39 for holding the blade 3 on the right surface (on the right side) of the projection 25a. The oscillation jig 39 is attached (installed) on the right surface of the projection 25a of the oscillation table 25. In other words, the linear friction welding apparatus 1 includes the oscillation jig 39 attachable on the right surface of the projection 25a of the oscillation table 25. A specific configuration of the oscillation jig 39 will be described below.

As shown in FIG. 6, the bed 13 is provided, on the upper side, with a pair of guide rails 41 located separately on the right side of the oscillation table 25. The paired guide rails 41 are separated from each other in the front-rear direction (one of the horizontal directions). The respective guide rails 41 extend in the lateral direction. The pair of the guide rails 41 is provided with a pressure table 43 on the upper side. The pressure table 43 is placed on the upper side of the bed 13 via the pair of the guide rails 41 and located separately on the right side of the oscillation table 25. The pressure table 43 is provided, on the lower surface (on the lower side), with a plurality of guided members 45 guided by the corresponding guide rails 41 in the lateral direction. The pressure table 43 is movable in the pressure direction (toward the left) and the opposite direction (toward the right) perpendicular to the oscillation direction via the pair of the guide rails 41 and the plural guided members 45.

The pressure table 43 includes a support frame 47 on the upper surface. The support frame 47 includes an inclined portion 47a inclined to the horizontal direction. The second column 17 includes a hydraulic pressure cylinder 49 serving as a pressure actuator in the middle for moving the pressure table 43 in the pressure direction and the opposite direction. The pressure cylinder 49 includes a piston rod 51 movable in the pressure direction and the opposite direction. The tip (the left end) of the piston rod 51 is connected to an appropriate position of the support frame 47 via a coupling 53. The pressure cylinder 49 is provided, at an appropriate position, with a linear scale (not shown) as a position measurement device for measuring a position of the pressure table 43 in the pressure direction. The tip of the piston rod 51 may be connected to an appropriate position of the pressure table 43, instead of the support frame 47. As the pressure actuator, an electric pressure cylinder or pressure motor (not shown) may be used instead of the hydraulic pressure cylinder 49.

The support frame 47 includes, on the inclined portion 47a, a pressure jig (a pressure holder unit) 55 for holding the disk 5 as a second metal component. The pressure jig 55 is provided on the pressure table 43 via the support frame 47.

The pressure jig 55 includes a pressure jig base (a pressure holder unit) 57 on the inclined portion 47a of the support frame 47. The pressure jig base 57 includes a circular rotary table 59 on the upper side. The rotary table 59 is rotatable on an axis inclined to the vertical direction (an axis of the rotary table 59). The rotary table 59 includes a chuck mechanism 61 in the middle (in the center portion) for attaching the disk 5 to the rotary table 59 in a concentric manner.

The rotary table 59 is configured to rotate on its axis so as to index (position) the disk projection 7 to a predetermined weld joint position at which the disk projection is welded. Namely, the pressure jig 55 is configured to index the disk projection 7 to a predetermined weld joint position by the rotation on the axis of the rotary table 59 (the rotation on the axis of the disk 5). When the rotary table 59 indexes the disk projection 7 to a predetermined weld joint position, the rotary table 59 causes the weld joint surface 7a of the disk projection 7 to parallel the oscillation direction.

The pressure jig base 57 includes a rotary motor (not shown) in the middle serving as a rotary actuator for rotating the rotary table 59 on its axis. The pressure jig base 57 further includes a hydraulic fixing cylinder (not shown) at an appropriate position serving as a fixing actuator for fixing the rotary table 59 to the pressure jig base 57.

The specific configuration of the oscillation jig (the oscillation holder unit) 39 according to the present embodiment is described below.

As shown in FIG. 1 to FIG. 4, the oscillation jig 39 includes an oscillation jig base (an oscillation holder base unit) 65 provided on the right surface of the projection 25a of the oscillation table 25 via a plurality of bolts 63. The oscillation jig 39 includes the oscillation jig base 65 which can be attached (installed) on the right surface of the projection 25a of the oscillation table 25 via the plural bolts 63. The oscillation jig base 65 includes a top block portion 65a on the upper side. The oscillation jig base 65 also includes a bottom block portion 65b on the lower side. The bottom block portion 65b is opposed to the top block portion 65a in the oscillation direction (in the vertical direction).

The oscillation jig base 65 includes a first clamp member 67 on the upper side of the bottom block portion 65b (on the upper side in the vertical direction). The oscillation jig base 65 also includes a second clamp member 69 opposed to the first clamp member 67 in the oscillation direction to hold (clamp) the held portion 3b of the blade 3 together with the first clamp member 67. A holding surface (a clamp surface) 67f of the first clam member 67 and a holding surface 69f of the second clamp member 69 each have a shape conforming to the held portion 3b of the blade 3. When the held portion 3b of the blade 3 is set on the holding surface 67f, the first clamp member 67 causes the weld joint surface 3a to parallel the oscillation direction.

Figure 2:
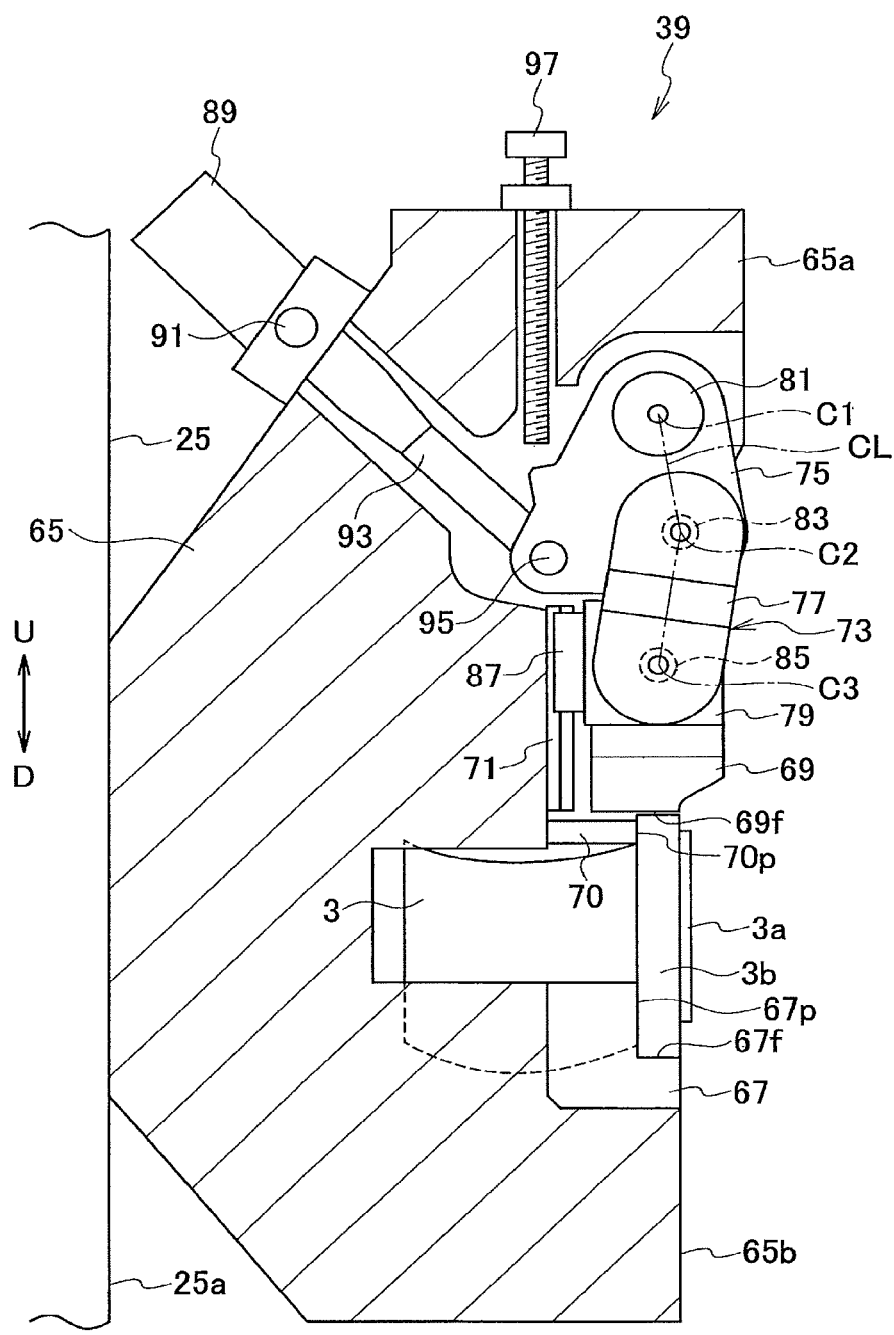
FIG. 2 is a cross-sectional view of the oscillation jig according to the first embodiment of the present disclosure, showing a state in which the held portion of the blade is released.

The first clamp member 67 includes a load receiving surface 67p for receiving a pressure load applied from the pressure cylinder 49 via one end of the held portion 3b of the blade 3 (the lower portion in FIG. 1 and FIG. 2). The load receiving surface 67p of the first clamp member 67 is brought into contact with the one end of the held portion 3*b* of the blade 3 and is parallel to the oscillation direction. The oscillation jig base 65 includes a load receiving member 70, located between the top block portion 65*a* and the first clamp member 67, for receiving the pressure load applied from the pressure cylinder 49 via the other end of the held portion 3*b* of the blade 3 (the upper portion in FIG. 1 and FIG. 2). The load receiving member 70 includes a load receiving surface 70*p* at the tip brought into contact with the other end of the held portion 3*b* of the blade 3. The load receiving surface 70*p* is located on the same plane as the load receiving surface 67*p* of the first clamp member 67. The oscillation jig base 65 also includes a guide rail 71 provided between the top block portion 65*a* and the load receiving member 70. The guide rail 71 extends in the oscillation direction. Instead of the first clamp member 67 including the load receiving surface 67*p*, the oscillation jig base 65 may include a load receiving member (not shown) for receiving the pressure load applied from the pressure cylinder 49 via the one end of the held portion 3*b* of the blade 3. Instead of the first clamp member 67 including the load receiving surface 67*p*, and the oscillation jig base 65 including the load receiving member 70, the oscillation jig base 65 may include a load receiving member (not shown) for receiving the pressure load applied from the pressure cylinder 49 via the both ends of the held portion 3*b* of the blade 3.

Figure 3:
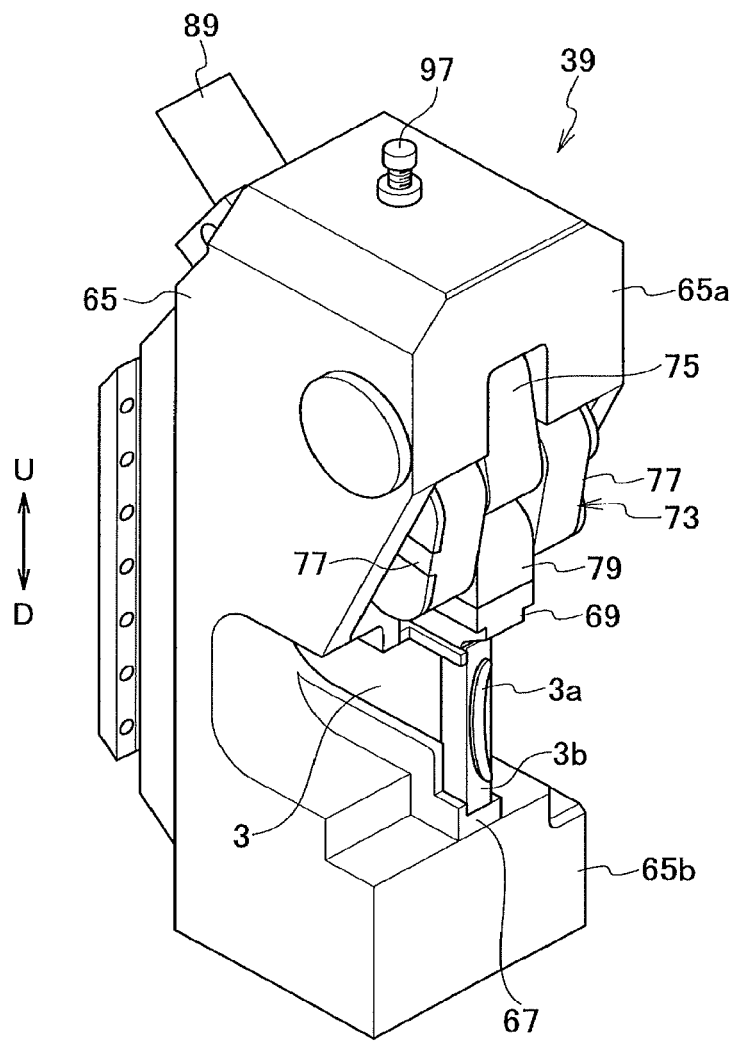
FIG. 3 is a perspective view of the oscillation jig according to the first embodiment of the present disclosure.

As shown in FIG. 1 to FIG. 3, the oscillation jig base 65 includes a link mechanism (a toggle mechanism) 73 at the lower side of the top block portion 65*a* (the lower side in the vertical direction). The link mechanism 73 is caused to extend and contract in the oscillation direction. The link mechanism 73 is composed of a plurality of links 75, 77, and 79 connected together. The respective links 75, 77, and 79 are a triangular drive link 75, a pair of elliptical (oval) driven links 77, and a slider 79.

A base end of the drive link 75 is rotatably connected to the top block portion 65*a* of the oscillation jig base 65 via a connection shaft (a drive shaft) 81. A connection center C1 of the base end of the drive link 75 conforms to the axis of the connection shaft 81. One end (the upper end) of the respective driven links 77 is rotatably connected to a tip (a first tip) of the drive link 75 via a connection shaft 83. A connection center C2 of the one end of the respective driven links 77 conforms to the axis of the connection shaft 83. The tips of the pair of the driven links 77 are located on both sides of the tip of the drive link 75.

The slider 79 is rotatably connected to the other end (the lower end) of the respective driven links 77 via a connection shaft 85. A connection center C3 of the slider 79 conforms to the axis of the connection shaft 85. The slider 79 is located between the tips of the pair of the driven links 77. The lower end surface of the slider 79 is connected (fixed) to the second clamp member 69. The second clamp member 69 is provided in the oscillation jig base 65 via the link mechanism 73 at a position opposed to the first clamp member 67 in the oscillation direction. The slider 79 is provided, on the left side (toward the oscillation jig base 65), with guided members 87 guided by the guide rail 71 in the oscillation direction. Namely, the slider 79 is movable (slidable) in the oscillation direction with respect to the oscillation jig base 65 via the guide rail 71 and the plural guided members 87. The slider 79 may include a shim (not shown) between the lower end surface thereof and the second clamp member 69 for adjusting the holding force between the first clamp member 67 and the second clamp member 69.

The oscillation jig base 65 includes a hydraulic clamp cylinder 89 serving as a clamp actuator on the upper left side for causing the link mechanism 73 to extend and contract in the oscillation direction. The clamp cylinder 89 is swingable on a horizontal swing axis via a swing shaft 91 (on an axis of the swing shaft 91) with respect to the oscillation jig base 65. The clamp cylinder 89 includes a piston rod 93 caused to extend and contract in a direction inclined to (intersecting) the oscillation direction. The tip of the piston rod 93 is rotatably connected to a part (a second tip) of the drive link 75 via a connection shaft 95. Instead of the hydraulic clamp cylinder 89, a pneumatic or electric clamp cylinder (not shown) may be used.

The oscillation jig 39 is configured such that the link mechanism 73 extends in the oscillation direction when the drive link 75 rotates in one direction (the clockwise direction in FIG. 1 and FIG. 2) on the axis of the connection shaft 81 in association with the contracting movement of the piston rod 93 in the inclined direction. The oscillation jig 39 is also configured such that the link mechanism 73 contracts in the oscillation direction when the drive link 75 rotates in the other direction (the counterclockwise direction in FIG. 1 and FIG. 2) on the axis of the connection shaft 81 in association with the extending movement of the piston rod 93 in the inclined direction.

The oscillation jig 39 is configured such that a connection center line CL connecting the respective connection centers of the links 75, 77, and 79 is made straight in the oscillation direction when the first clamp member 67 holds the held portion 3*b* of the blade 3 together with the second clam member 69. As used herein, the term "connection center line CL" is a line connecting the connection center C1 of the base end of the drive link 75, the connection center C2 of the one end of the respective driven links 77, and the connection center C3 of the slider 79. The term "straight line" encompasses not only a geometrically exact straight line but also a line sufficient for the link mechanism 73 to exert a toggle mechanism.

The oscillation jig base 65 includes a stopper screw 97 at the top (at the upper portion) of the top block portion 65*a*. The stopper screw 97 prevents the rotation of the drive link 75 in the one direction immediately after the connection center line CL is made straight.

Next, the operations and effects of the present embodiment are described below.

(Operation regarding oscillation jig 39)

The held portion 3*b* of the blade 3 is set on the holding surface 67*f* of the first clamp member 67 (between the holding surface 67*f* of the first clamp member 67 and the holding surface 69*f* of the second clamp member 69), so as to cause the weld joint surface 3*a* of the blade 3 to parallel the oscillation direction. One end of the held portion 3*b* of the blade 3 is brought into contact with the load receiving surface 67*p* of the first clamp member 67, and the other end of the held portion 3*b* of the blade 3 is brought into contact with the load receiving surface 70*p* of the load receiving member 70. When the clamp cylinder 89 operates to cause the piston rod 93 to contract in the inclined direction, the drive link 75 rotates in the one direction on the axis of the connection shaft 81, so that the link mechanism 73 is caused to extend in the oscillation direction. The second clamp member 69 is then moved to one side in the oscillation direction (downward in the vertical direction), so as to hold the held portion 3*b* of the blade 3 by the holding surface 67*f* of the first clamp member 67 and the holding surface 69*f* of the second clamp member 69. The oscillation jig 39 thus can hold and fix the blade 3 to the oscillation table 25 in the state in which the weld joint surface 3*a* of the blade 3 parallels the oscillation direction.

As described above, the oscillation jig 39 is configured such that the connection center line CL is made straight when the first clamp member 67 holds the held portion 3b of the blade 3 together with the second clamp member 69. Thus, the link mechanism 73 can exert a toggle mechanism to increase the holding force (the clamping force) of the first clamp member 67 and the second clamp member 69 without an increase in the thrust of the clamp cylinder 89. Further, an inertial force in association with the reciprocating movement of the oscillation table 25 can directly be received by the link mechanism 73 without interference by the clamp cylinder 89, so as to stabilize the holding force of the first clamp member 67 and the second clamp member 69.

When the blade 3 is removed from the oscillation jig 39, the clamp cylinder 89 operates to cause the piston rot 93 to extend in the inclined direction, and the drive link 75 then rotates in the other direction on the axis of the connection shaft 81 so as to contract the link mechanism 73 in the oscillation direction. The second clamp member 69 is thus moved to the other side in the oscillation direction (upward in the vertical direction), so as to release the holding state (the clamping state) of the first clamp member 67 and the second clamp member 69 for the blade 3.

(Operation regarding pressure jig 55)

The pressure jig 55 holds the disk 5 such that the disk 5 is attached to the rotary table 59 in a concentric manner by the chuck mechanism 61. The rotary table 59 is caused to rotate on its axis by the operation of the rotary motor, so as to index one disk projection 7 to a predetermined weld joint position and cause the weld joint surface 7a of the corresponding disk projection 7 to parallel the oscillation direction. The rotary table 59 is then fixed to the pressure jig base 57, namely to the pressure table 43 by the operation of the fixing cylinder. Accordingly, the disk 5 is fixed to the pressure table 43 in the state in which the weld joint surface 7a of the disk projection 7 parallels the oscillation direction.

(Operation regarding entire linear friction welding apparatus 1)

The weld joint surface 3a of the blade 3 held by the oscillation jig 39 is opposed to the weld joint surface 7a of the disk projection 7 of the disk 5 held by the pressure jig 55 in parallel to the oscillation direction. The oscillation cylinder 33 then operates to cause the oscillation table 25 to reciprocate in the oscillation direction at predetermined amplitude. In addition, the pressure cylinder 49 operates to move the pressure table 43 in the pressure direction, while the position of the pressure table 43 in the pressure direction is measured by the linear scale. The weld joint surface 7a of the disk projection 7 is then led to come closer to the weld joint surface 3a of the blade 3 which is being reciprocated in the oscillation direction so as to press the weld joint surface 7a of the disk projection 7 against the weld joint surface 3a of the blade 3 at a predetermined pressure load. When the amount of movement of the pressure table 43 from an original position reaches a pre-target approach amount set smaller than a target approach amount, the operation of the oscillation cylinder 33 is stopped. The pressure table 43 is continuously moved in the pressure direction until the amount of movement of the pressure table 43 from the original position reaches the target approach amount. The weld joint surface 7a of the disk projection 7 thus can be pressed against the weld joint surface 3a of the blade 3 at a predetermined pressure load in the state in which the movement of the blade 3 is stopped. Accordingly, a frictional heat is generated between the weld joint surface 3a of the blade 3 and the weld joint surface 7a of the disk projection 7, so as to fix and weld the weld joint surface 3a of the blade 3 and the weld joint surface 7a of the disk projection 7 together.

As used herein, the term "original position" of the pressure table 43 refers to a position of the pressure table 43 in the pressure direction located at the point when the weld joint surface 7a of the disk projection 7 is brought into contact with the weld joint surface 3a of the blade 3. The term "target approach amount" refers to a predetermined amount of approach (the amount of displacement) of the pressure table 43 sufficient to weld the weld joint surface 3a of the blade 3 and the weld joint surface 7a of the disk projection 7 together.

After the weld joint surface 3a of the blade 3 and the weld joint surface 7a of the disk projection 7 are welded together, the welded blade 3 is removed from the oscillation jig 39, and the following blade 3 is then held by the oscillation jig 39. In addition, the rotary table 59 rotates on its axis so as to index the following disk projection 7 to a predetermined weld joint position. The weld joint surface 3a of the following blade 3 and the weld joint surface 7a of the following disk projection 7 are then welded together in the same manner as described above. The welding operation is repeated for the rest of the weld joint surfaces 3a of the blades 3 and the weld joint surfaces 7a of the disk projections 7 until the blades 3 and the disk projections 7 are all welded together.

The weld joint surfaces 3a of the blades 3 and the weld joint surfaces 7a of the disk projections 7 welded together are finished into a product state as a blisk by machining in the subsequent step.

According to the present embodiment, as described above, the link mechanism 73 can exert a toggle mechanism to increase the holding force of the first clamp member 67 and the second clamp member 69 without an increase in the thrust of the clamp cylinder 89. The linear friction welding apparatus 1 thus can keep the strongly-fixed state of the blade 3 to the oscillation table 25 during welding, so as to sufficiently ensure the accuracy of welding between the weld joint surface 3a of the blade 3 and the weld joint surface 7a of the disk projection 7, while preventing an increase in size of the clamp cylinder 89 and achieving a reduction in size of the entire linear friction welding apparatus 1 accordingly.

According to the present embodiment, as described above, the inertial force in association with the reciprocating movement of the oscillation table 25 can directly be received by the link mechanism 73, so as to stabilize the holding force of the first clamp member 67 and the second clamp member 69. Accordingly, the strongly-fixed state of the blade 3 to the oscillation table 25 during welding can be stabilized, so as to further improve the accuracy of welding between the weld joint surface 3a of the blade 3 and the weld joint surface 7a of the disk projection 7.

The present embodiment can increase the accuracy of welding between the weld joint surface 3a of the blade 3 and the weld joint surface 7a of the disk projection 7, while ensuring a reduction in size of the entire linear friction welding apparatus 1.

The present disclosure is not intended to be limited to the description of the embodiment described above, and may be applicable to various modes as described below.

For example, the upper frame 19 may include a heating unit (not shown) as disclosed in Japanese Patent Application Publication No. 2012-228703. In such a case, the weld joint surface 3a of the blade 3 and the weld joint surface 7a of the disk projection 7 may be heated by the heating unit before the oscillation table 25 is caused to reciprocate in the oscillation direction. In addition, instead of the pressure table 43 movable in the pressure direction and the opposite direction, the oscillation table 25 may be movable in the pressure direction and the opposite direction integrally together with the first column 15. An intermediate link (not shown) may be interposed between the drive link 75 and the driven links 77. The oscillation direction may be the horizontal direction, instead of the vertical direction, for example. Further, the technical idea applied to the linear friction welding apparatus 1 for welding the weld joint surface 3a of the blade 3 and the weld joint surface 7a of the disk projection 7 together may be applied to a linear friction welding apparatus for welding a pair of metal components other than the blade 3 and the disk 5 (not shown).

Second Embodiment

A linear friction welding apparatus according to a second embodiment of the present disclosure is described below. As shown in FIG. 8 to FIG. 12, the linear friction welding apparatus 110 according to the present embodiment includes a pressure mechanism 114 for pressing a blade B (a first member) and a disk Di (a second member) against each other, and an oscillation mechanism 116 having an oscillation axis Q in a direction perpendicular to a pressure axis P (a work welding axis) of the pressure mechanism 114 and configured to oscillate the blade B in the oscillation axial direction so as to cause a relative oscillation movement between the blade B and the disk Di. The oscillation mechanism 116 is located below an intersection C between the pressure axis P and the oscillation axis Q (located on a base portion 118, for example). According to the present embodiment, the pressure axis P conforms to the horizontal direction, and the oscillation axis Q conforms to the vertical direction.

The linear friction welding apparatus 110 according to the present embodiment includes a slider 122, a bearing mechanism 124, and a controller 128. The slider 122 is movable in the vertical direction while holding a blade jig 120 (a first holding member) for holding the blade B (refer to FIG. 8, FIG. 9, and FIG. 11). The bearing mechanism 124 receives a pressure force in the pressure axial direction applied from the pressure mechanism 114 and acting on the slider 122 via the blade B. The controller 128 controls the respective members operated during the linear friction welding (refer to FIG. 10).

The base portion 118 of the present embodiment is formed into a flat table, and installed on an installation floor surface of the liner friction welding apparatus 110 via an interference mechanism. The blade jig 120 is detachably fixed to the slider 122 with bolts or the like.

The bearing mechanism 124 includes a hydrostatic bearing 125. The hydrostatic bearing 125 receives the pressure force acting on the slider 122. The oscillation mechanism 116 is located below the intersection C between the pressure axis P and the oscillation axis Q, and the bearing mechanism 124 is located above the oscillation mechanism 116.

The oscillation mechanism 116 includes an oscillation cylinder 117 in contact with the bottom of the blade jig 120. The blade jig 120 is thus held by the slider 122 on the lateral side and in contact with the oscillation cylinder 117 on the lower side.

(Slider and drop prevention mechanism)

Figure 9:
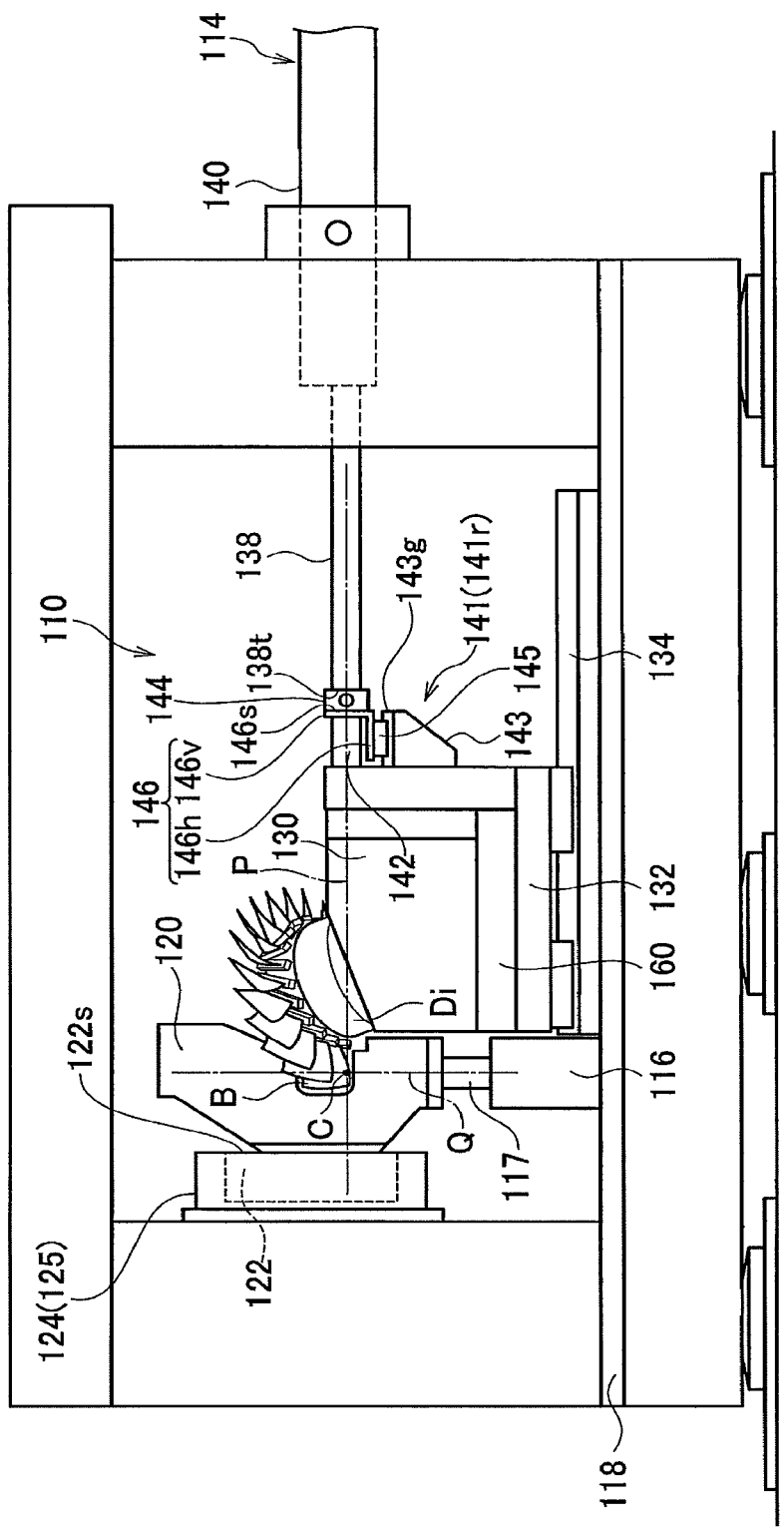
FIG. 9 is a front view of the linear friction welding apparatus according to the second embodiment of the present disclosure (at a welding operation position).

As shown in FIG. 9, the slider 122 includes a contact surface 122s on the front side in contact with the blade jig 120. The contact surface 122a has a groove (not shown) for positioning the blade jig 120, for example.

The hydrostatic bearing 125 is open on the front side of its housing such that the contact surface 122s of the slider 122 in contact with the blade jig 120 is exposed. The front side of the contact surface 122s slightly protrudes from the front side of the housing of the hydrostatic bearing 125 toward the blade jig 120. The slider 122 has a thickness sufficient to withstand the pressure force applied from the pressure mechanism 114.

(Pressure mechanism)

The pressure mechanism 114 includes the blade jig 120, a disk jig 130 (another holding member), a transport table 132, and a rail 134. The disk jig 130 holds the disk Di (the second member). The transport table 132 holds the disk jig 130 loaded thereon. The rail 134 guides the transport table 132 from a loading position to a welding operation position. As used herein, the term "loading position" refers to a position at which the disk jig 130 is loaded on the transport table 132 upon implementing the linear friction welding, and a position at which a blink obtained after all welding operations are finished is removed. The term "welding operation position" refers to a position at which the disk Di and the disk B are brought into contact with each other and the operation of the linear friction welding is performed.

Figure 10:
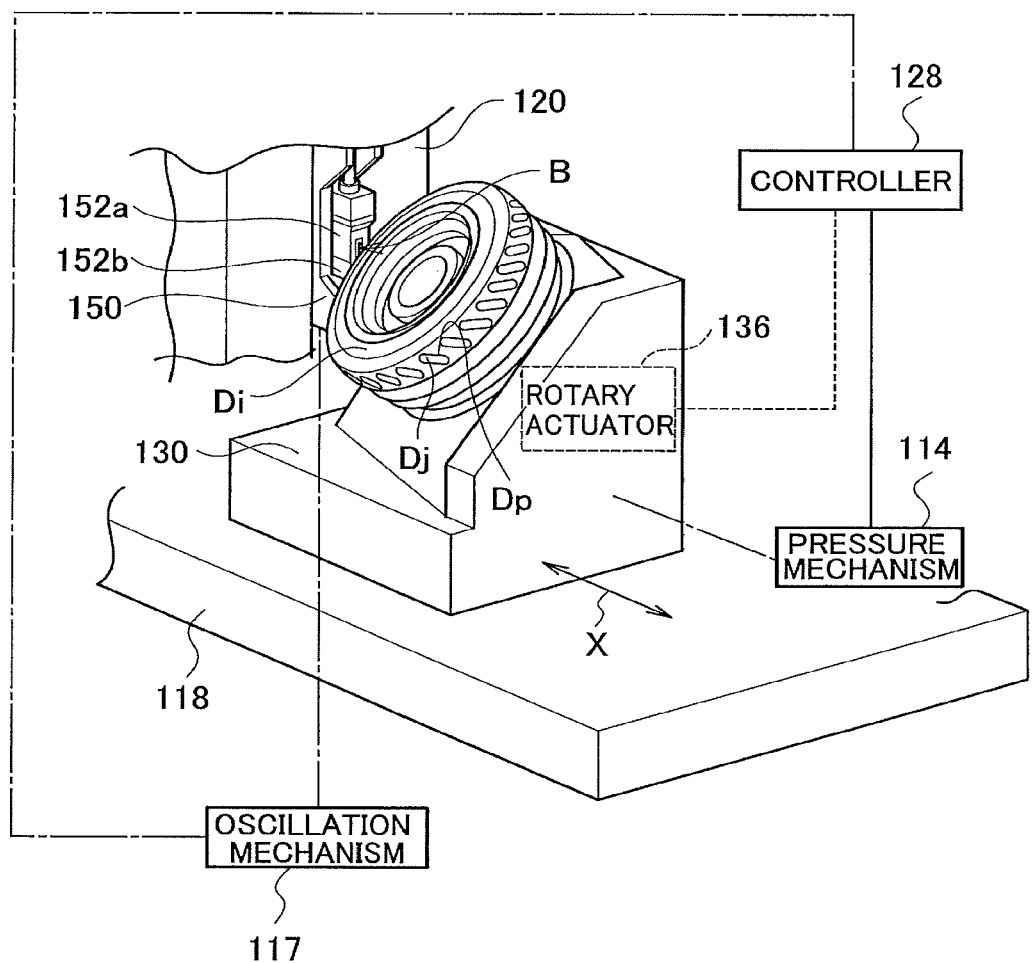
FIG. 10 is a perspective view of the linear friction welding apparatus according to the second embodiment of the present disclosure (in a welding operation state).
Figure 11:
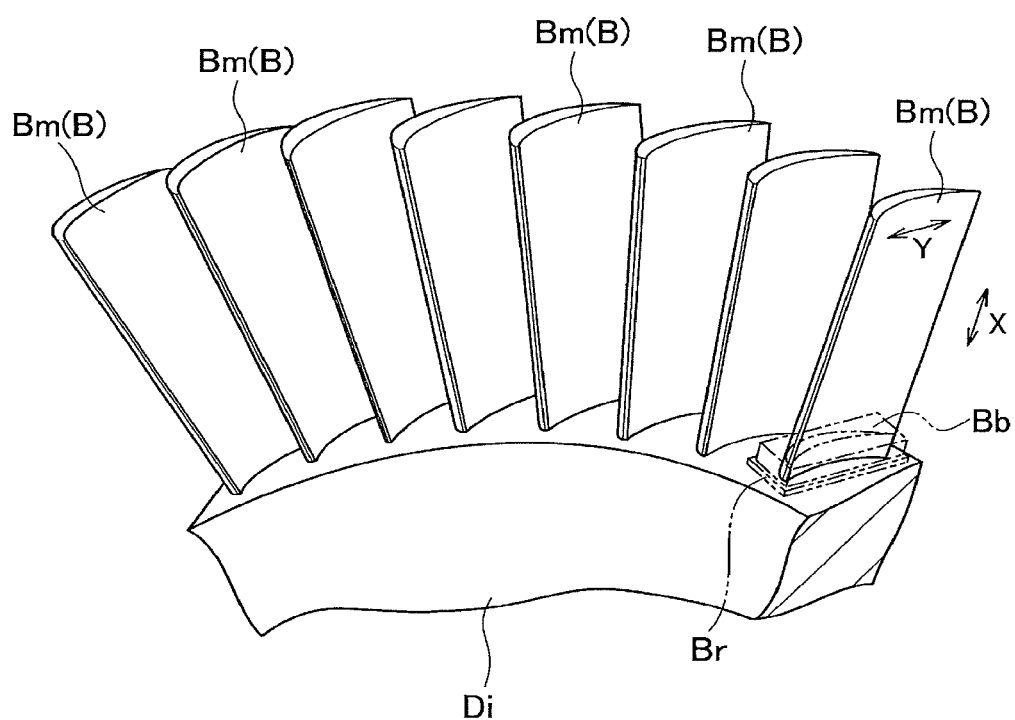
FIG. 11 is a partly-enlarged perspective view of a blisk manufactured by the linear friction welding apparatus according to the second embodiment of the present disclosure.
Figure 12:
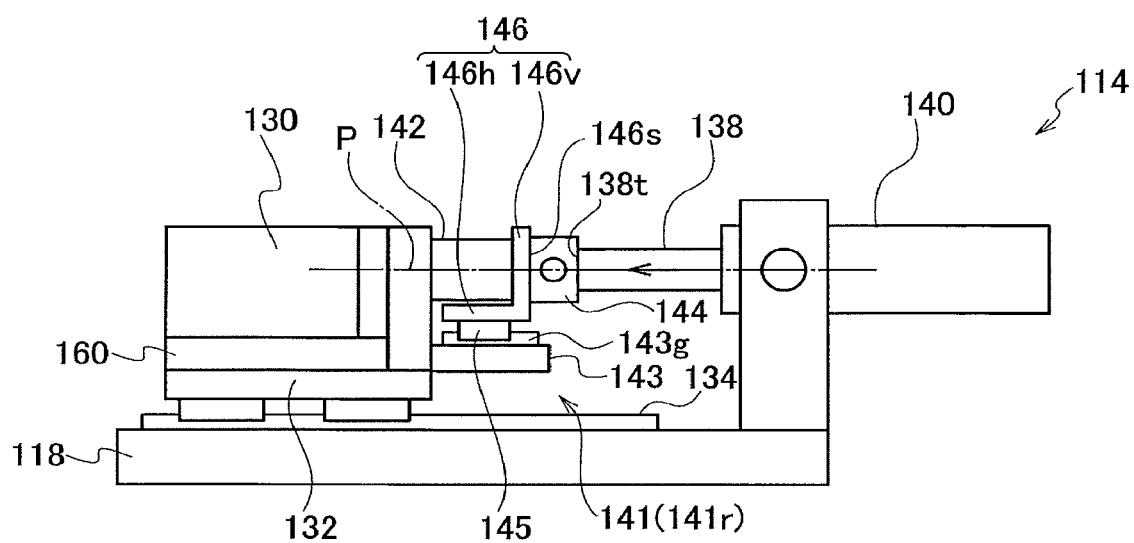
FIG. 12 is a front view of a principal part of the linear friction welding apparatus according to the second embodiment of the present disclosure.

The disk jig 130 is equipped therein with a rotary actuator 136 (refer to FIG. 10). The controller 128 controls the disk Di to rotate in the circumferential direction by one pitch which is an interval between adjacent two blades during the operation of the linear friction welding.

The pressure mechanism 114 includes a piston rod 138 (a pressure force application member) caused to advance and retreat in the direction conforming to the pressure axis P, a cylinder 140 for causing the piston rod 138 to advance and retreat, and a load sensor 142 located on the pressure axis P to measure the pressure force in the direction conforming to the pressure axis P. The load sensor 142 is attached to the disk jig 130 on the piston rod side.

The pressure mechanism 114 further includes a support mechanism 141 fixed to the disk jig 130 and connected to the piston rod 138 to support a moment load applied from the piston rod 138. The support mechanism 141 of the present embodiment includes a linear guide 141r.

The linear guide 141r includes a base member 143 fixed to the disk jig 130 on the piston rod side, and a support member 146 having a block 145 engaged with a guide rail 143g extending in the direction conforming to the pressure axis P on the upper side of the base member 143 to slide and move along the guide rail 143g.

The support member 146 has an L-shape in a side view, and includes an engagement portion 146h provided with the block 145 and a pressure force transmission portion 146v having a plate-like shape and extending upward from the engagement portion 146h. A tip portion 138t of the piston rod 138 and an outer surface 146s of the pressure force transmission portion 146v are connected together via a connection piece 144. The pressure force transmission portion 146v is located between the load sensor 142 and the piston rod 138.

Due to this configuration, when the pressure force of the piston rod 138 is changed in the state in which the blade B and the disk Di is in contact with each other at the welding operation position, the pressure force for pressing the blade B and the disk Di against each other is changed via the pressure force transmission portion 146v and the load sensor 142. The load sensor 142 transmits the measured pressure force to the controller 128 as a measurement signal.

(Blade and blade jig)

The blade B has a blade body Bm, and a held portion Bb to be clamped and formed on the base side of the blade body Bm. The end portion on the base side of the blade body Bm is provided with a welded surface Bj welded by friction welding and located on the inner side of the held portion Bb as viewed from the blade base side in the blade length direction X. The welded surface Bj is welded by friction welding to a weld joint surface Dj formed on the tip side of a projection Dp located on the outer circumferential surface of the disk Di (refer to FIG. 10).

The blade B has a rectangular flange Br provided in the held portion Bb toward the welded surface Bj and having a size larger than the held portion Bb. The held portion Bb and the flange Br are cut and removed so as to obtain a regular shape of the blade B, as indicated by the virtual lines shown in FIG. 11, after the blade B is welded to the disk Di by the friction welding.

The blade body Bm has a curved shape of which the front side is concave and the rear side is convex. The blade body Bm is entirely twisted such that the front edge of the blade body Bm on the blade tip side leans forward in the rotation direction of the blade B as compared with that on the blade base side.

As shown in FIG. 10, the blade jig 120 includes a base block 150, a pair of upper and lower holding blocks 152a and 152b for clamping the held portion Bb of the blade B, and a hydraulic cylinder (not shown) composing a clamp operation drive source.

The blade jig 120 is applied with an oscillation force from the oscillation cylinder 117 so as to reciprocate in the wing chord direction Y of the blade B. The oscillation cylinder 117 is composed of a hydraulic cylinder, for example.

According to the present embodiment, the controller 128 controls the rotation of the disk Di by the rotary actuator 136, the pressure force of the disk jig 130 applied from the pressure mechanism 114 toward the blade jig 120, the oscillation force applied from the oscillation mechanism 116 to the blade jig 120, and the like.

In the linear friction welding apparatus 110, the hydraulic cylinder causes the upper holding block 152a of the blade jig 120 to rise and fall, so as to switch the upper and lower holding blocks 152a and 152b between a clamping state and an unclamping state for the held portion Bb. Accordingly, the blade B is automatically supplied to the blade jig 120, so as to entirely automate the friction welding of the blade B to the disk Di.

(Operations and effects)

Next, the operations and effects of the present embodiment are described below. According to the present embodiment, the piston rod 138 is extended so that the disk jig 130 moves toward the blade jig 120. When the piston rod 138 is extended, the support member 146 slides and moves toward the disk jig 130 along the guide rail 143g. The disk jig 130 is then pushed to move toward the blade jig 120 via the load sensor 142 and the support member 146 in contact with the tip of the load sensor 142.

The angle of the central axis of the disk Di is then adjusted. Subsequently, while the oscillation in the vertical direction is caused by the oscillation cylinder 117 to oscillate the slider 122 in the vertical direction, the piston rod 138 is extended to bring the weld joint surface Dj of the disk Di into contact with the welded surface Bj on the blade base side at the welding operation position so as to be pressed against each other. Accordingly, the weld joint surface Dj and the welded surface Bj are rubbed together in the vertical direction to generate a frictional heat, so as to lead the interface between the surfaces to a high temperature to cause melting.

During this operation, the piton rod 138 presses not the load sensor 142 but the pressure force transmission portion 146v of the support member 146 as a part of the linear guide 141r. Therefore, even when a downward load of the piston rod 138 due to the own weight acts on the connection piece 144 when the piston rod 138 is extended, the downward load is mainly applied to the support member 146 and transmitted to and supported by the disk jig 130 via the base member 143. Namely, the downward load is hardly applied to the load sensor 142.

After the predetermined melting is caused, the oscillation of the oscillation cylinder 117 is stopped to stop the oscillation of the blade B, so that the portion composing the weld joint surface Dj and the portion composing the welded surface Bj are solidified together, and the blade B is thus welded to the disk Di. When the melting starts, the blade B slightly moves toward the disk Di due to the pressure force.

The held state of the blade B by the slider 122 is then released, and the piston rod 138 is caused to slightly retreat. The disk jig 130 is thus caused to retreat from the slider 122 to an intermediate standby position (at a position where the disk jig 130 is on standby until the following blade B is placed at the arrangement position after the operation of the linear friction welding of the current blade B with respect to the disk Di is finished). The welded blade B is separated from the slider 122 at the intermediate standby position, and the disk Di is thus rotatable on the central axis.

The disk Di is then rotated and moved by a predetermined angle on the central axis, and stopped when the weld joint surface Dj of the following projection Dp reaches the welding operation position. In association with the rotary movement, the following blade B is held and clamped by the upper and lower holding blocks 152a and 152b (refer to FIG. 10).

In the same manner as described above, the piston rod 138 is extended to press the welded surface Bj of the blade B and the weld joint surface Dj of the disk Di against each other while the oscillation is caused by the oscillation cylinder 117, so as to generate a frictional heat to implement the linear friction welding. The rest of the blades B are subsequently welded to the disk Di accordingly.

Thereafter, the held portion Bb and the flange Br of the blade B, and also burrs on the welded surface Bj caused by the friction welding, are cut and removed with an end mill or the like so as to obtain a regular shape of the respective blades B. Accordingly, a blisk in which the disk Di and the blades B are integrated together is completed.

According to the present embodiment, as described above, the downward load caused by the extended piston rod 138 is applied to the connection piece 144 but hardly acts on the load sensor 142. The linear friction welding apparatus 110 thus can ensure higher measurement accuracy of the load sensor 142 than the conventional apparatus. Accordingly, the blades B and the disk Di composing a blisk can be welded together by the friction welding with higher accuracy.

The support mechanism 141 includes the linear guide 141r, so as to simplify the structure to improve the measurement accuracy.

The pressure mechanism 114 includes the piston rod 138 serving as a pressure force application member, so as to simplify the structure.

Although the present embodiment exemplified the case in which the linear guide 141r is used as the support mechanism 141, a translational guide member, such as a static pressure guide and a roller follower, having the same rigidity and fiction coefficient as the linear guide, may be used.

The present embodiment exemplified the case in which the base of the blade B is welded to the weld joint surface Dj of the disk Di by the friction welding to manufacture a blisk. The present embodiment may also be applicable appropriately to a case in which a blisk already manufactured in which a part of the blades B is broken is repaired such that the broken blade B is removed and replaced by a new blade for repair to be welded to the blisk.

Comparative Example

Figure 16:
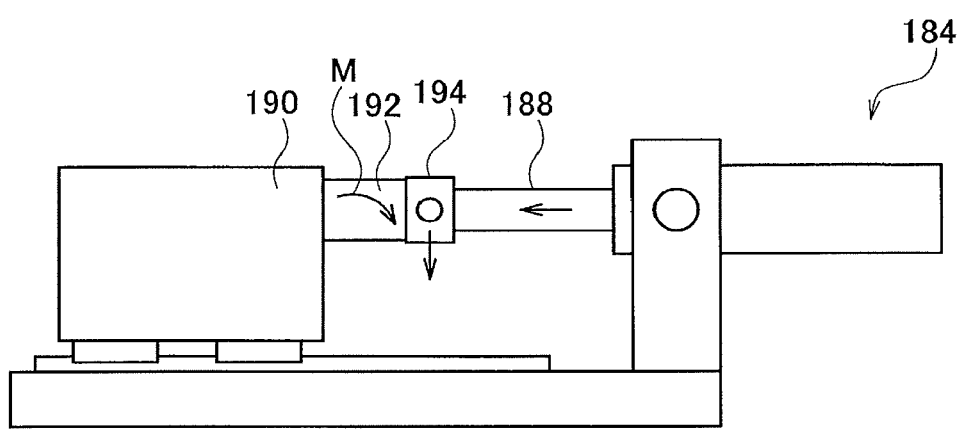
FIG. 16 is a front view illustrating a conventional linear friction welding apparatus.

FIG. 16 is a front view illustrating a pressure mechanism 184 included in a conventional linear friction welding apparatus to press a blade and a disk against each other. The pressure mechanism 184 includes a piston rod 188 caused to advance and retreat in the pressure axial direction, a load sensor 192, and a connection piece 194. The load sensor 192 extends from a disk jig 190 for holding the disk Di toward the piston rod 188 to measure a pressure force in the pressure axial direction. The connection piece 194 connects the tip of the piston rod 188 to the tip of the load sensor 192.

A downward load acting on the piston rod 188 caused by gravity increases in the pressure mechanism 184 as the extension length of the piston rod 188 increases. The load is directly applied to the load sensor 192 via the connection piece 194. Since the downward load or a moment load M (a bending moment) applied to the load sensor 192 is large, it is difficult to accurately measure the pressure force actually acting on the blade and the disk, which prevents an increase in the accuracy of the friction welding.

In contrast, the piston rod 138 of the linear friction welding apparatus 110 presses not the load sensor 142 but the support member 146 of the linear guide 141r when the piston rod 138 is extended (caused to advance). Therefore, even when the moment load (the bending moment) or the downward load acting on the piston rod 138 when advancing increases, the moment load or the downward load is hardly applied to the load sensor 142 but mainly applied to the support member 146. The linear friction welding apparatus 110 thus can improve the measurement accuracy of the load sensor 142 as compared with the conventional apparatus, and accordingly, the blades B and the disk Di composing a blisk can be welded together by the friction welding with higher accuracy.

Third Embodiment

Figure 13:
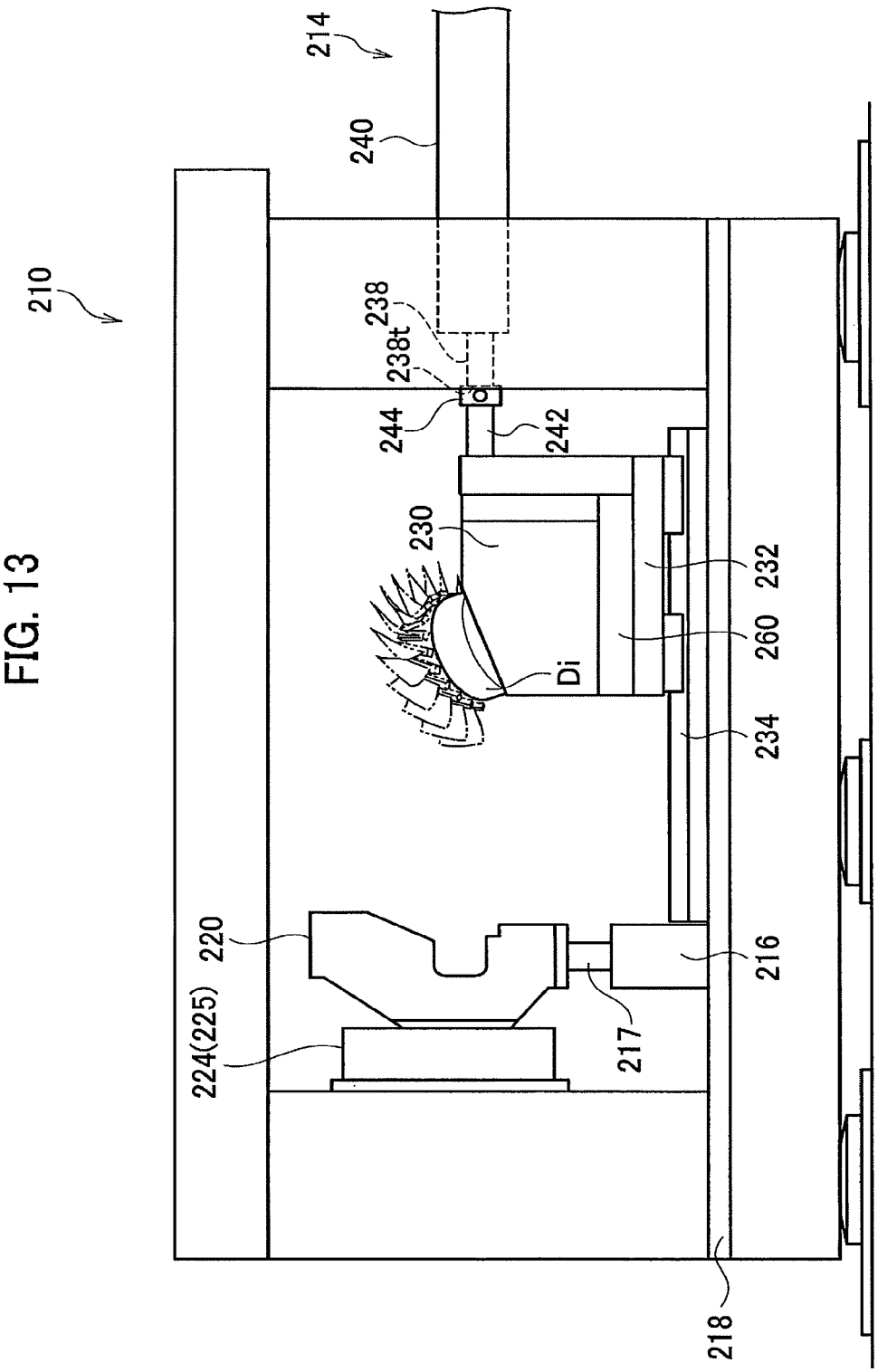
FIG. 13 is a front view of a linear friction welding apparatus according to a third embodiment of the present disclosure (at a loading position).
Figure 14:
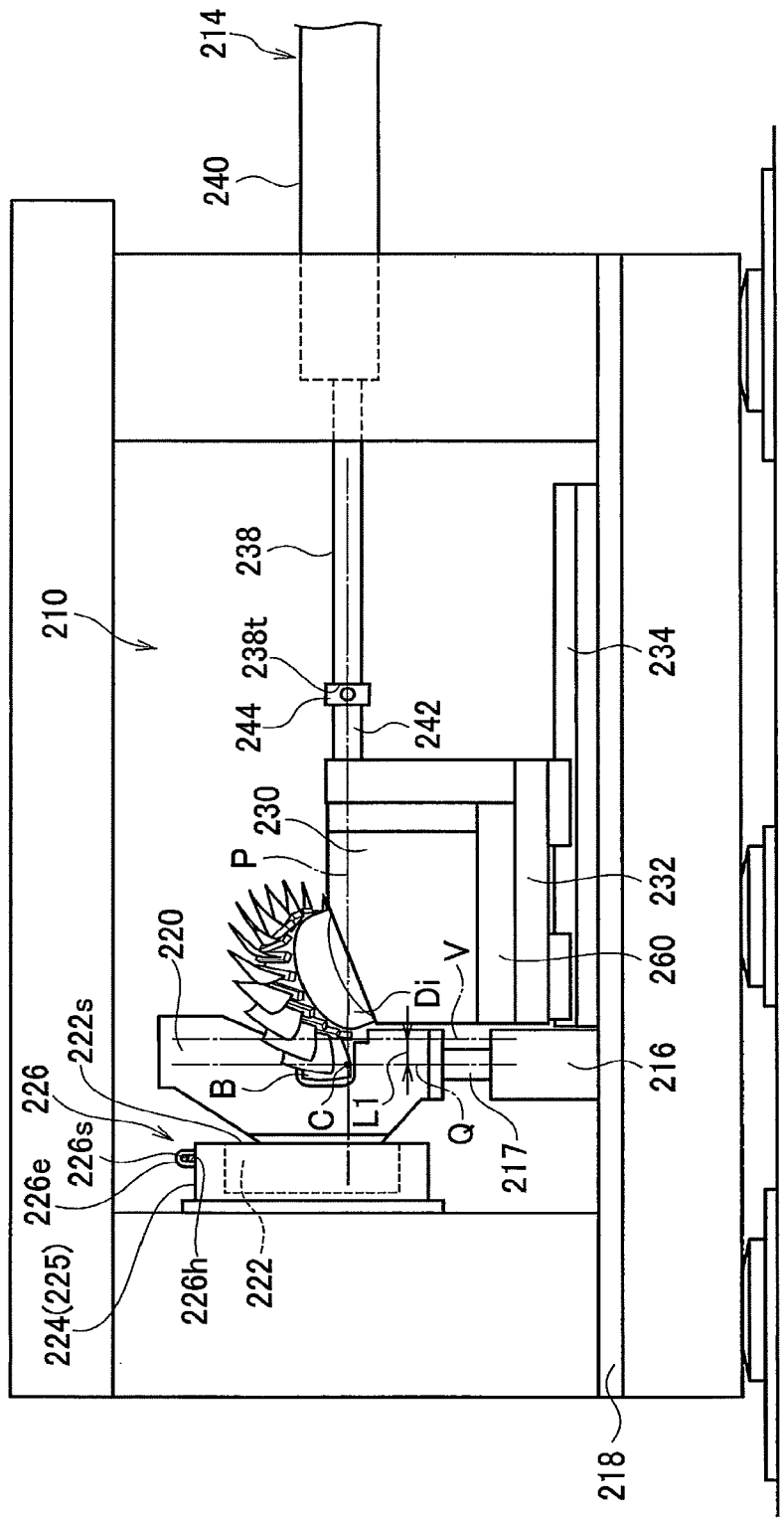
FIG. 14 is a front view of the linear friction welding apparatus according to the third embodiment of the present disclosure (at a welding operation position).

A linear friction welding apparatus according to a third embodiment of the present disclosure is described below. As shown in FIG. 13 to FIG. 15, the linear friction welding apparatus 210 according to the present embodiment includes a pressure mechanism 214 and an oscillation mechanism 216. The pressure mechanism 214 presses a blade B (a first member) and a disk Di (a second member) against each other. The oscillation mechanism 216 has an oscillation axis Q in a direction perpendicular to a pressure axis P of the pressure mechanism 214, and oscillates the blade B in the direction conforming to the oscillation axis Q so as to cause a relative oscillation movement between the blade B and the disk Di. The oscillation mechanism 216 is located below the intersection C between the pressure axis P and the oscillation axis Q (located on a base portion 218, for example). According to the present embodiment, the pressure axis P conforms to the horizontal direction, and the oscillation axis Q conforms to the vertical direction.

The linear friction welding apparatus 210 according to the present embodiment includes a slider 222, a bearing mechanism 224, a drop prevention mechanism 226, and a controller 228. The slider 222 is movable in the vertical direction while holding a blade jig 220 (a first holding member) for holding the blade B (refer to FIG. 13, FIG. 14, and FIG. 15). The bearing mechanism 224 receives a pressure force in the direction conforming to the pressure axis P applied from the pressure mechanism 214 and acting on the slider 222 via the blade B. The drop prevention mechanism 226 prevents the slider 222 from dropping down when the blade jig 220 does not hold the blade B (refer to FIG. 15). The controller 228 controls the respective members operated during the linear friction welding. The controller 228 is identical to the controller 128 according to the second embodiment, and the respective elements connected to the controller 228 correspond to the respective elements in the second embodiment shown in FIG. 10. The illustration of the controller 228 in the drawings is thus omitted in the present embodiment.

The base portion 218 of the present embodiment is formed into a flat table, and installed on an installation floor surface of the liner friction welding apparatus 210 via an interference mechanism. The blade jig 220 is detachably fixed to the slider 222 with bolts or the like.

The bearing mechanism 224 includes a hydrostatic bearing 225. The hydrostatic bearing 225 receives the pressure force acting on the slider 222. The oscillation mechanism 216 is located below the intersection C between the pressure axis P and the oscillation axis Q, and the bearing mechanism 224 is located above the oscillation mechanism 216.

The oscillation mechanism 216 includes an oscillation cylinder 217 in contact with the bottom of the blade jig 220. The blade jig 220 is thus held by the slider 222 on the lateral side and in contact with the oscillation cylinder 217 on the lower side.

(Slider and drop prevention mechanism)

As shown in FIG. 15, the slider 222 includes a contact surface 222s on the front side in contact with the blade jig 220.

The hydrostatic bearing 225 is open on the front side of a housing 222h such that the contact surface 222s of the slider 222 in contact with the blade jig 220 is exposed. The front side of the contact surface 222s slightly protrudes from the front side of the housing 222h of the hydrostatic bearing 225 toward the blade jig 220.

The slider 222 has a thickness t (refer to FIG. 15(a)) sufficient to withstand the pressure force applied from the pressure mechanism 214.

As shown in FIG. 15, the drop prevention mechanism 226 includes a bracket-like extension 226e, a stopper rod 226s inserted into an elongated hole 226h, and an air cylinder 226a for causing the stopper rod 226s to advance and retreat. The extension 226e extends upward from the slider 222, and has the elongated hole 226h elongated in the vertical direction. When the stopper rod 226s is inserted in the elongated hole 226h, the slider 222 is prevented from dropping down even when the blade jig 220 is detached from the slider 222, since the stopper rod 226s is in contact with the upper end on the inner circumferential surface of the elongated hole 226h. Namely, the lower end position of the extension 226e is regulated.

(Pressure mechanism)

The pressure mechanism 214 includes the blade jig 220, a disk jig 230 (another holding member), a transport table 232, and a rail 234. The disk jig 230 holds the disk Di (the second member). The transport table 232 holds the disk jig 230 loaded thereon. The rail 234 guides the transport table 232 from a loading position to a welding operation position. As used herein, the term "loading position" refers to a position at which the disk jig 230 is loaded on the transport table 232 upon implementing the linear friction welding, and a position at which a blisk obtained after all welding operations are finished is removed. The term "welding operation position" refers to a position at which the disk Di and the disk B are brought into contact with each other and the operation of the linear friction welding is performed.

The disk jig 230 is equipped therein with a rotary actuator 236 (identical to the rotary actuator 136 shown in FIG. 10). The controller 228 controls the disk Di to rotate in the circumferential direction by one pitch which is an interval between adjacent two blades during the operation of the linear friction welding.

The pressure mechanism 214 includes a piston rod 238 caused to advance and retreat in the direction conforming to the pressure axis P, a cylinder 240 for causing the piston rod 238 to advance and retreat, and a load sensor 242 located on the pressure axis P to measure the pressure force in the direction conforming to the pressure axis P. The load sensor 242 is attached to the disk jig 230 on the piston rod side. A tip 238t of the piston rod 238 and the load sensor 242 are connected to each other via a connection piece 244.

Due to this configuration, when the pressure force of the piston rod 238 is changed in the state in which the blade B and the disk Di is in contact with each other at the welding operation position, the pressure force for pressing the blade B and the disk Di against each other is changed via the load sensor 242. The load sensor 242 transmits the measured pressure force to the controller 228 as a measurement signal.
(Blade and blade jig)

The blade B has a blade body Bm, and a held portion Bb to be clamped and formed on the base side of the blade body Bm. The end portion on the base side of the blade body Bm is provided with a welded surface Bj welded by friction welding and located on the inner side of the held portion Bb as viewed from the blade base side in the blade length direction X. The welded surface Bj is welded by friction welding to a weld joint surface Dj formed on the tip side of a projection Dp located on the outer circumferential surface of the disk Di (refer to FIG. 10).

The blade B has a rectangular flange Br provided in the held portion Bb toward the welded surface Bj and having a size larger than the held portion Bb. The held portion Bb and the flange Br are cut and removed so as to obtain a regular shape of the blade B, as indicated by the virtual lines shown in FIG. 11, after the blade B is welded to the disk Di by the friction welding.

The blade body Bm has a curved shape of which the front side is concave and the rear side is convex. The blade body Bm is entirely twisted such that the front edge of the blade body Bm on the blade tip side leans forward in the rotation direction of the blade B as compared with that on the blade base side.

The blade jig 220 includes a base block 250, a pair of upper and lower holding blocks 252a and 252b for clamping the held portion 13b of the blade B, and a hydraulic cylinder (not shown) composing a clamp operation drive source. These elements are respectively identical to the blade jig 120, the base block 150, and the holding blocks 152a and 152b shown in FIG. 10 in the second embodiment.

The blade jig 220 is applied with an oscillation force from the oscillation cylinder 217 so as to reciprocate in the wing chord direction Y of the blade B. The oscillation cylinder 217 is composed of a hydraulic cylinder, for example.

According to the present embodiment, the controller 228 controls the rotation of the disk Di by the rotary actuator 236, the pressure force of the disk jig 230 applied from the pressure mechanism 214 toward the blade jig 220, the oscillation force applied from the oscillation mechanism 216 to the blade jig 220, and the like.
(Operations and effects)

Next, the operations and effects of the present embodiment are described below. According to the present embodiment, the piston rod 238 is extended so that the disk jig 230 moves toward the blade jig 220. The angle of the central axis of the disk Di is then adjusted. Subsequently, while the oscillation in the vertical direction is caused by the oscillation cylinder 217 to oscillate the slider 222 in the vertical direction, the piston rod 238 is extended to bring the weld joint surface Dj of the disk Di into contact with the welded surface Bj on the blade base side at the welding operation position so as to be pressed against each other. Accordingly, the weld joint surface Dj and the welded surface Bj are rubbed together in the vertical direction to generate a frictional heat, so as to lead the interface between the surfaces to a high temperature to cause melting.

After the predetermined melting is caused, the oscillation of the oscillation cylinder 217 is stopped to stop the oscillation of the blade B, so that the portion composing the weld joint surface Dj and the portion composing the welded surface Bj are solidified together, and the blade B is thus welded to the disk Di. When the melting starts, the blade B slightly moves toward the disk Di due to the pressure force.

The held state of the blade B by the slider 222 is then released, and the piston rod 238 is caused to slightly retreat. The disk jig 230 is thus caused to retreat from the slider 222 to an intermediate standby position (at a position where the disk jig 230 is on standby until the following blade B is placed at the arrangement position after the operation of the linear friction welding of the current blade B with respect to the disk Di is finished). The welded blade B is separated from the slider 222 at the intermediate standby position, and the disk Di is thus rotatable on the central axis.

The disk Di is then rotated and moved by a predetermined angle on the central axis, and stopped when the weld joint surface Dj of the following projection Dp reaches the welding operation position. In association with the rotary movement, the following blade B is held and clamped by the upper and lower holding blocks 252a and 252b. The holding blocks 252a and 252b are respectively identical to the holding blocks 152a and 152b shown in FIG. 10 in the second embodiment.

In the same manner as described above, the piston rod 238 is extended to press the welded surface Bj of the blade B and the weld joint surface Dj of the disk D against each other while the oscillation is caused by the oscillation cylinder 217, so as to generate a frictional heat to implement the linear friction welding. The rest of the blades B are subsequently welded to the disk Di accordingly.

Thereafter, the held portion Bb and the flange Br of the blade B, and also burrs on the welded surface Bj caused by the friction welding, are cut and removed with an end mill or the like so as to obtain a regular shape of the respective blades B. Accordingly, a blisk in which the disk Di and the blades B are integrated together is completed.

According to the present embodiment, the oscillation mechanism 216 (the oscillation cylinder 217) is located below the intersection C between the pressure axis P and the oscillation axis Q. This configuration can lead the contact point (the weld joint portion) between the blade B and the disk Di to come closer to the oscillation axis Q. Namely, a decrease in a distance L1 between the oscillation axis Q and the work welding axis V passing through the contact point between the blade B and the disk Di can be achieved. The moment load acting on the blade B (the work) thus can be reduced, so as to improve the accuracy of weld joint positioning in the linear friction welding apparatus. The linear friction welding apparatus with this configuration possesses a great advantage particularly in a case in which the depth of the blade B (the length in the blade length direction X) is increased when the size of the blade B is increased.

The oscillation mechanism 216 is in contact with the bottom of the blade jig 220, so as to greatly decrease the height of the oscillation mechanism 216 as compared with the conventional case. In addition, a hydraulic device composing the oscillation mechanism 216 (such as a device for oscillating the oscillation cylinder 217) is located at a low position, so as to facilitate the fixation or maintenance of the oscillation mechanism 216. Further, a wider space can be ensured above the linear friction welding apparatus 210 than the conventional apparatus, so as to expand the possibility of arrangement of a supplementary device such as a heating coil for induction heating, and easily ensure the rigidity of the supplementary device.

In the present embodiment, the oscillation cylinder 217 is directly in contact with the blade jig 220 for holding the blade B. This configuration can decrease the distance L1 between the oscillation axis Q and the contact point (the weld joint portion) between the blade B and the disk Di, so as to greatly reduce the moment load acting on the blade B and achieve a great improvement in the accuracy of the weld joint positioning.

The linear friction welding apparatus 210 includes the drop prevention mechanism 226 for preventing the slider 222 from dropping down when the slider 222 does not hold the blade jig 220. For example, the blade jig 220 may be required to be replaced by another jig for welding a blade B having different dimensions, or replaced by a jig, instead of the blade jig, for holding other members. The drop prevention mechanism 226 can prevent the slider 222 from dropping down when the blade jig 220 to be replaced is detached from the slider 222, so as to facilitate the replacing operation for a short period of time.

The drop prevention mechanism 226 has a simple structure including the extension 226e, the stopper rod 226s, and the air cylinder 226a, as described above.

The rail 234 is elongated from the loading position to the welding operation position. Since the transport table 232 is guided by the rail 234, the operation of the linear friction welding for the respective blades B can be performed efficiently.

The bearing mechanism 224 includes the hydrostatic bearing 225, so as to receive a large pressure force with a simple structure.

Before the oscillation force is applied from the oscillation cylinder 217, the blade B, particularly the welded surface Bj of the blade B of which the held portion Bb is clamped by the upper and lower holding blocks 252a and 252b, may be heated to a temperature suitable for the friction welding. The blade B may be heated directly, or may be heated indirectly via the blade jig 220. Whether or not the blade B is heated may be determined as appropriate depending on the material used for the disk Di and the blade B, or depending on the process of the linear friction welding operations performed by the linear friction welding apparatus 210.

The present embodiment exemplified the case in which the base of the blade B is welded to the weld joint surface Dj of the disk Di by the friction welding to manufacture a blisk. The present embodiment may also be applicable appropriately to a case in which a blisk already manufactured in which a part of the blades B is broken is repaired such that the broken blade B is removed and replaced by a new blade for repair to be welded to the blisk.

Comparative Example

Figure 17:
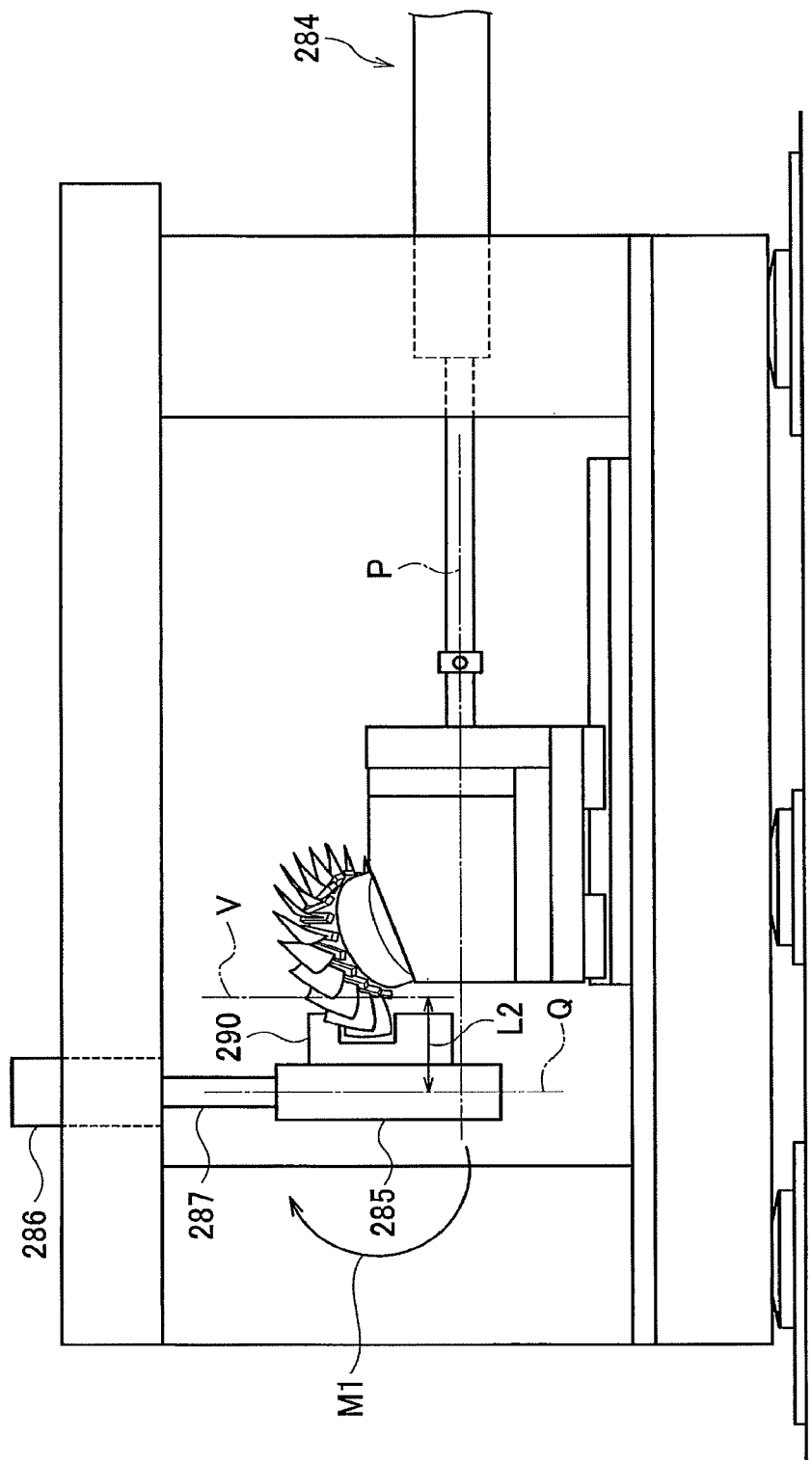
FIG. 17 is a front view illustrating a conventional linear friction welding apparatus.

FIG. 17 is a front view illustrating a conventional linear friction welding apparatus. The conventional linear friction welding apparatus includes a pressure mechanism 284, an oscillation mechanism 286, a hydrostatic bearing 285, and a blade jig 290. The pressure mechanism 284 presses a blade B and a disk Di against each other. The oscillation mechanism 286 has an oscillation axis Q in a direction perpendicular to a pressure axis P of the pressure mechanism 284. The hydrostatic bearing 285 is hung on an oscillation cylinder 287 composing the oscillation mechanism 286. The blade jig 290 is fixed to the hydrostatic bearing 285 to hold the blade B.

The oscillation cylinder 287 oscillates the hydrostatic bearing 285 in the vertical direction to oscillate the blade jig 290 in the vertical direction, namely, to oscillate the blade B in the vertical direction, so as to generate a frictional heat between the disk Di and the blade B to implement linear friction welding.

In the conventional linear friction welding apparatus, a distance L2 between the oscillation axis Q and the work welding axis V is large, and a large moment load M1 acts on the blade B because the hydrostatic bearing 285 receives the pressure force applied from the pressure mechanism 284 via the blade B and the blade jig 290. As a result, it is difficult to exhibit the welding with high positioning accuracy.

In contrast, according to the linear friction welding apparatus 210 of the present embodiment, the oscillation mechanism 216 is in contact with the bottom of the blade jig 220, and the blade jig 220 is in contact with both the slider 222 and the oscillation cylinder 217 and is oscillated in the vertical direction. Since the distance between the oscillation axis Q and the work welding axis V is decreased as compared with the conventional apparatus, the moment load acting on the blade B is reduced as compared with the moment load M1 caused in the conventional apparatus. Accordingly, the accuracy of the weld joint positioning in the linear friction welding apparatus 210 can greatly be improved.

It should be noted that the present disclosure includes various embodiments which are not described herein. Therefore, the scope of the present disclosure is defined only by the scope of the appended claims reasonably derived from the description described above.

What is claimed is:

1. A linear friction welding apparatus for welding a first member and a second member together by friction welding by pressing the first member and the second member against each other while causing a relative oscillation movement between the first member and the second member, the apparatus comprising:
a pressure mechanism configured to press the first member and the second member against each other;
a first holding member configured to hold the first member; and a second holding member configured to hold the second member and caused to advance and retreat in a direction conforming to a pressure axis, the pressure mechanism comprising:

a pressure force application member caused to advance and retreat in the direction conforming to the pressure axis;

a load sensor attached to the second holding member and configured to measure a pressure force in the direction conforming to the pressure axis; and a support mechanism fixed to the second holding member, connected to the pressure force application member, and configured to support a moment load applied from the pressure force application member, the support mechanism comprising:

a base member fixed to the second holding member; and a support member including a pressure force transmission portion located between the load sensor and the pressure force application member, engaged with the base member so as to advance and retreat in the direction conforming to the pressure axis, and connected to a tip of the pressure force application member.

2. The linear friction welding apparatus according to claim 1, wherein the support mechanism includes a linear guide.

3. The linear friction welding apparatus according to claim 1, wherein the pressure force application member is a piston rod.

4. The linear friction welding apparatus according to claim 1, further comprising:

an oscillation mechanism having an oscillation axis in a direction perpendicular to the pressure axis of the pressure mechanism and configured to oscillate the first member or the second member in the direction of the oscillation axis to cause the relative oscillation movement between the first member and the second member;

a slider configured to hold the first holding member and movable in a vertical direction;

a bearing mechanism configured to receive a pressure force acting on the slider in the direction conforming to the pressure axis; and a drop prevention mechanism configured to prevent the slider from dropping down when the slider does not hold the first holding member, wherein the oscillation mechanism includes an oscillation cylinder in contact with a bottom of the first holding member, and is located below an intersection between the pressure axis and the oscillation axis.

5. The linear friction welding apparatus according to claim 4, wherein the drop prevention mechanism includes:

an extension extending upward from the slider and having an elongated hole elongated in the vertical direction; and a stopper inserted into the elongated hole to regulate a lower end position of the extension.

6. The linear friction welding apparatus according to claim 4, wherein the pressure mechanism includes:

a transport table configured to hold the second holding member loaded thereon; and a rail configured to guide the transport table from a loading position at which the second holding member is loaded on the transport table to a welding operation position at which a linear friction welding operation is performed.

7. The linear friction welding apparatus according to claim 1, further comprising:

an oscillation table caused to reciprocate in an oscillation direction; and an oscillation jig provided on the oscillation table and configured to hold the first member, the oscillation jig comprising:

an oscillation jig base connected to the oscillation table;

a first clamp member provided in the oscillation jig base;

a second clamp member located at a position opposed to the first clamp member in the oscillation direction and configured to hold the first member together with the first clamp member;

a link mechanism provided in the oscillation jig base, composed of a plurality of links connected together, connected to the second clamp member, and caused to extend and contract in the oscillation direction; and a clamp actuator configured to cause the link mechanism to extend and contract in the oscillation direction, wherein, when the first clamp member and the second clamp member hold the first member, a connection center line connecting connection centers of the respective links is made straight in the oscillation direction.

8. The linear friction welding apparatus according to claim 7, wherein the plurality of the links includes:

a drive link having a base end rotatably connected to the oscillation jig base;

a driven link having one end and another end, the one end being rotatably connected to a tip of the drive link; and a slider rotatably connected to the other end of the driven link, connected to the second clamp member, and movable in the oscillation direction with respect to the oscillation jig base.

9. The linear friction welding apparatus according to claim 1, wherein the first member is a blade as a part of a blisk.

* * * * *